(12) United States Patent
Solheim et al.

(10) Patent No.: US 6,377,207 B1
(45) Date of Patent: Apr. 23, 2002

(54) PASSIVE POLARIMETRIC MICROWAVE RADIOMETER FOR DETECTING AIRCRAFT ICING CONDITIONS

(76) Inventors: Fredrick S. Solheim, 6351 Glenmoor Rd., Boulder, CO (US) 80303; Albin J. Gasiewski, 756 6th St., Boulder, CO (US) 80302

( * ) Notice: Subject to any disclaimer, the term of this patent is extended or adjusted under 35 U.S.C. 154(b) by 0 days.

(21) Appl. No.: 09/671,665

(22) Filed: Sep. 27, 2000

(51) Int. Cl.$^7$ ............ G01W 1/02; G01S 3/02; G01S 13/95

(52) U.S. Cl. ............ 342/351; 342/26; 342/192; 342/195; 324/640; 73/170.16; 73/170.26

(58) Field of Search ............ 342/26, 175, 192–197, 342/351; 73/170.16, 170.17, 170.18, 170.26, 170.27; 324/640, 637–639, 641–646

(56) References Cited

U.S. PATENT DOCUMENTS 5,777,481 A * 7/1998 Vivekanandan ............ 324/640

FOREIGN PATENT DOCUMENTS

| DE | 3940253 A1 | * | 6/1991 | ............ G01J/5/46 |
| GB | 1387252 A | * | 3/1975 | ............ G01J/3/36 |
| GB | 2302227 A | * | 1/1997 | ............ G01S/13/34 |
| WO | WO-97/37213 A1 | * | 10/1997 | ............ G01N/22/04 |

\* cited by examiner

Primary Examiner—Bernarr E. Gregory
(74) Attorney, Agent, or Firm—Harold A. Burdick

(57) ABSTRACT

The passive polarimetric microwave radiometer is a simple and low cost radiometric icing detection system that operates over a suitable set of frequency bands in the millimeter wave region of the spectrum to provide useful signatures for detecting aircraft icing conditions. This basic passive polarimetric microwave radiometer observes along a single line of sight and consists of a dual polarization dual frequency radiometer that is pointed in the direction of interest, such as the projected flight path, and operates at a frequency which is sensitive to the polarizing effects of hydrometeors. The passive polarimetric microwave radiometer could also observe in a horizontal plane around the aircraft or ground station and include both vertical and horizontal scanning capability. By utilizing polarimetric observations near two widely separated lines at frequencies with matching attenuations (and therefore matching range sensitivities) a stronger spectral signal providing information on hydrometeor habit (size and shape) can be obtained. Such additional information is especially important to characterize volumes containing mixed phases of liquid water and ice (wetted ice crystals, or interspersed ice and liquid hydrometeors) and for determining hydrometeor shapes and size distributions. The radiometric signals from the antenna can be downconverted with local oscillators centered at around 60 GHz, 118.75 GHz, and/or 183 GHz, and use filter banks to separate out baseband sidebands into a plurality of frequency intervals at various frequency separations from the local oscillator frequency, thus obtaining radiometric sensitivities with a variety of differing weighting functions, and therefore range sensitivities. Alternatively, direct detection of signals passing through high frequency filters at desired frequencies can be utilized.

26 Claims, 11 Drawing Sheets

| Hydrometeor type | Viewing horizontally | | | Viewing above the horizon | | | Viewing above the horizon | | |
|---|---|---|---|---|---|---|---|---|---|
| | Brightness $S_0 = (T_{b,v} + T_{b,h})/2$ | Polarization $S_1 = (T_{b,v} - T_{b,h})$ | Spectral Difference $S_{0,118} - S_{0,50}$ | Brightness $S_0 = (T_{b,v} + T_{b,h})/2$ | Polarization $S_1 = (T_{b,v} - T_{b,h})$ | Spectral Difference $S_{0,118} - S_{0,50}$ | Brightness $S_0 = (T_{b,v} + T_{b,h})/2$ | Polarization $S_1 = (T_{b,v} - T_{b,h})$ | Spectral Difference $S_{0,118} - S_{0,50}$ |
| Clear air (baseline) | $T_b$ = flight altitude temperature | $S_1 = 0$ | None | Very cold $T_b$'s | $S_1 = 0$ | Nominally small value | Very warm $T_b$'s over land, cool $T_b$'s over water | $S_1$ positive, variable depending on surface type | Nominally small value |
| Small to large droplets (<200 microns) | $T_b$ = flight altitude temperature | Small positive value | Large (~factor of 20) scattering signal difference (Raleigh regime) | Cool to warm $T_b$'s | $S_1$ zero to small positive value | Strong scattering signal difference | Moderate cooling in $T_b$'s | $S_1$ reduced WRT clear air value | Strong scattering signal difference |
| Very large drops (>300 microns) | $T_b$ = flight altitude temperature | Very small positive or negative value | Moderate difference in scattering (Raleigh regime), diminishing droplet size (Mie regime) | Warm $T_b$'s | $S_1$ decreasing or negative WRT clear air value | Little scattering signal difference | Cooling in $T_b$'s | $S_1$ reduced WRT clear air value, but not as much as for small droplets | Little scattering signal difference |
| Small ice crystals (<~200 microns) | $T_b$ = flight altitude temperature | Small negative value | Large (~factor of 20) scattering signal difference (Raleigh regime) | Cool $T_b$'s | $S_1$ less than small droplet value | Strong scattering signal difference | Small to moderate cooling in $T_b$'s | $S_1$ increasing WRT clear air value | Strong scattering signal difference |
| Large ice crystals (>300 microns) | | | | Cool $T_b$'s | $S_1$ less than small droplet value | Little scattering signal difference | Small to moderate cooling in $T_b$'s | $S_1$ increasing WRT clear air value | Little scattering signal difference |

FIG. 6

PASSIVE POLARIMETRIC MICROWAVE RADIOMETER FOR DETECTING AIRCRAFT ICING CONDITIONS

FIELD OF INVENTION

This invention relates to systems that can passively and remotely sense meteorological conditions from an airborne platform or from a ground station and, in particular, to a passive polarimetric microwave radiometer for detecting aircraft icing conditions.

PROBLEM

It is a problem in the field of aircraft operations that the occurrence of supercooled liquid droplets in the atmosphere presents a significant aviation hazard in that these particles are prone to instantaneous nucleation into solid water (ice) when subjected to minor mechanical perturbations. The size of the droplets and the temperature range of concern are approximately 5 to 200 microns in diameter and from approximately −30° C. to 0° C., respectively. If the supercooled liquid droplets undergo a phase transition to ice due to contact with a control, thrusting, lifting, or other external surface of either a fixed-wing or rotary-wing aircraft, the resulting surface becomes coated with ice, thus degrading the aerodynamic qualities of the surface and ultimately leading to reduced lift and possible stall of the aircraft. Accrued ice on external surfaces of the aircraft reduces aircraft performance, including: limits climb and ceiling capabilities, reduces airspeed, increases fuel consumption, reduces control, and reduces range. Icing also chokes engine inlets, fuel and other vents; coats radio antennas, which reduces transmission range; and obscures vision by coating windscreens and sensor optics and/or radomes. The aircraft icing hazard is especially serious for rotary wing aircraft because of the large volume of air swept by the rotor blades, the varying angle of attack of the advancing and retreating blades (as the blades rotate they tend to collect ice around the entire airfoil), and the criticality of the airfoil shape to maintaining laminar flow, and hence control and lift.

The size and temperature of water droplets determine the likelihood of ice formation. Large droplets are less common than medium-sized or small droplets because they tend to spontaneously nucleate at supercooled temperatures, and thus comprise a relatively small fraction of total supercooled cloud liquid water occurrences. Small droplets are also of less significance since they are more likely to be carried around the aircraft surface by laminar boundary airflow. Small droplets are also less likely to nucleate upon impact with aircraft surfaces due to the effects of surface tension in maintaining their spherical shape. Temperatures colder than ∼−30° C. typically cause spontaneous nucleation, wherein a rapid conversion of the water into crystalline ice takes place. Ice crystals are less of a danger since they do not adhere to aircraft surfaces as readily as nucleating supercooled liquid. Therefore, clouds comprised solely of ice crystals are not an icing hazard. Liquid water droplets can be present along with ice crystals (a so-called mixed phase condition), and are generally depleted over time by contact with ice crystals, self-glaciation, evaporation, or precipitation processes. In the mixed-phase condition, however, the liquid droplets are necessarily supercooled, and thus present an icing hazard. Such mixed phase conditions are common within convection, a condition that is often also a source of moderate to extreme turbulence. At temperatures above freezing, water droplets remain liquid upon impact with aircraft surfaces and are rapidly shed by the slipstream.

Aircraft icing has been determined to be the cause of many aviation accidents, and can be avoided if the presence of supercooled droplets in the path of an aircraft can be determined at least a few nautical miles ahead of the aircraft. Typical flight times required for evasive maneuvering range from ∼15 seconds (for helicopters) to a minute (for large jet aircraft). Given the typical velocities of jet aircraft (∼240–550 knots), such an icing determination would be valuable at distances out to ∼10 nautical miles ahead of the aircraft. Moreover, any instrumentation installed for icing detection should be simple (to be reliable), low cost (to facilitate installation on a large fleet of regional carrier and general aviation aircraft), reliable (requiring little maintenance and calibration), unambiguous in warning, and require little or no interpretation by the air crew at a time when their cockpit work load is high.

One existing icing detection system is disclosed in U.S. Pat. No. 5,028,929, wherein a forward-looking airborne radar system is used for detection of supercooled liquid droplets using a dual-frequency radar scheme. The return signals of the two radar frequencies are processed by calculating a calculus derivative of the difference in attenuation between the two radar frequencies over various radar ranges to determine the liquid water density in the atmosphere at that radar range. Suitable radar frequency pairs used in this system are X-band and Ka-band. The dual-frequency radar system is active in that it requires a powerful pulsed transmitter with associated range gating electronics. Accordingly, the dual-frequency radar system is heavy, requires a significant amount of power, is costly, and is more prone to component failure than a passive system. Matched antenna gain patterns are also critical to the accuracy of the radar measurements. Moreover, the dual-frequency radar system emits signals that are potentially detectable and trackable, thus placing military aircraft operating in a hostile environment and using the dual-frequency radar system under increased threat of detection and enemy fire. However, the dual-frequency radar system has the advantage of providing more precise range information on the distance of a supercooled liquid cell from the aircraft than a passive system.

U.S. Pat. No. 5,526,676 discloses a passive microwave radiometer utilizing a tunable frequency synthesizer as a local oscillator. Included in this microwave radiometer is a method of utilizing the varying attenuation of radio signals across an atmospheric line feature to vary the range or distance to features of interest. This microwave radiometer further measures the ranging of liquid water, the intensity of emission of which varies approximately as frequency squared, by measuring the skew of a line shape profile due to the greater enhancement of emission of the high frequency side of the line relative to the low frequency side of the line. These methodologies are pertinent to measuring the range or distance to aircraft icing conditions.

The article written by I. A. Tarabukin and G. G. Shchukin, entitled "Detection of Possible Aircraft Icing in Clouds by Passive-Active Radars", was published in the Proceedings of the Specialist Meeting on Microwave Radiometry and Remote Sensing Applications, a NOAA publication, pages 381–385, June 1992. This paper describes experimental results suggesting that icing conditions can be detected in many instances using a combination of passive and active systems. The active system (radar) determines the presence and location of clouds, and the passive system (radiometer) refines the measurement of the amount of liquid water in the cloud by measuring unpolarized emission (the first Stokes parameter) at a shallow angle above the horizon. This detection scheme requires the simultaneous use of both a passive and active sensor, and thus requires significantly more instrumentation than the system proposed herein.

A passive icing avoidance system was also described in the MIAS project to operate at 37 and 89 GHz. This system relies on extremely narrow antenna beams looking forward at two horizontal angles to detect the presence of clouds by their characteristic brightness (first Stokes parameter). It is similar to the method of Tarabukin and Shchukin above. The unpolarized emission signature of these methods can be ambiguous for some meteorological conditions, however. This is shown by icing conditions and non-icing conditions having similar emission signatures as a function of elevation angle. The system does not provide a means of distinguishing supercooled liquid droplets from ice or warm liquid droplets. Moreover, the antenna size needed to synthesize the narrow antenna beams required (1–2 degrees) are impractically large for forward-looking installations on most aircraft.

Thus, there are several existing airborne system concepts proposed for the detection of the presence of conditions which could cause aircraft icing, but each of these systems incurs penalties in sensor cost or accuracy of operation that are inherent in their underlying architecture. There is no existing system or concept that has a clear advantage over other systems and the user must make a tradeoff between cost and efficacy of the system. There are no known ground-based icing detection systems.

SOLUTION

The above described problems are solved and a technical advance achieved by the present passive polarimetric microwave radiometer, which is a simple and low cost radiometric icing detection system that operates over suitable frequency bands in the millimeter wave region of the spectrum to provide useful signatures for detecting aircraft icing conditions. A polarimetric radiometer is distinguished from a conventional radiometer by being capable of independently measuring radiation in at least the vertical and horizontal polarizations (first and second modified Stokes parameters). This passive polarimetric microwave radiometer observes along a line of sight in or near the forward direction and consists of a dual polarization radiometer that is pointed in the direction of interest, such as the projected flight path, and operates at a frequency which is sensitive to the polarizing effects of hydrometeors (water as either liquid droplets or frozen snow, ice, or graupel particles). The mathematical difference in intensity between the vertical and horizontal polarization (the second Stokes parameter) is different for liquid and ice in sign, magnitude, and behavior at viewing angles in the vicinity of the horizon. The passive polarimetric microwave radiometer can incorporate a scanning mechanism that allows it to observe over a horizontal plane around the aircraft at the flight altitude, or can scan to observe in a vertical plane ahead of the aircraft, or can operate to scan in both the horizontal and vertical directions.

In one embodiment of this passive polarimetric microwave radiometer, the difference in microwave radiation that is scattered from hydrometeors into a near-horizontal direction in at least one frequency band viewed at about 10 degrees above the horizon and having vertical polarization compared with the microwave radiation scattered from hydrometeors into the same near-horizontal direction and having horizontal polarization. The measured difference in scattered radiation for spherical water droplets is positive, but is negative for ice crystals for viewing angles above the horizon, and positive for viewing angles below the horizon.

The scattered signal is strongly dependent upon both the frequency of the microwave radiation and the mean hydrometeor size. Therefore, using a plurality of microwave frequencies along with polarization yields information on both hydrometeor size and shape (which is related to phase— liquid or ice).

If the microwave frequencies that are utilized have different values of signal absorption as they pass through the atmosphere, then range information to the hydrometeor is also obtained. The passive polarimetric microwave radiometer can include horizontal and/or vertical scanning to determine the range to the hydrometeors and related meteorological features, to obtain the spatial distribution of hydrometeors in the atmosphere, and to determine cloud structure from tomographic and other methods. The plurality of observation frequencies used can lie on one or several atmospheric spectral line features or in a number of window regions between spectral line features, or a combination of both. Pairs of frequencies or a number of frequencies in the atmospheric spectrum can be chosen such that the signal absorptions by the atmosphere at these frequencies are equal or approximately equal so that the range sensitivity, or distance to the meteorological feature, is matched between frequencies. Several levels of equality can be chosen such that several range sensitivities are obtained. The emission signals are thus matched at the various ranges, which enables the passive polarimetric microwave radiometer to isolate the scattered signals from the emission signals, and allows direct comparisons of scattered signals that are strongly related to hydrometeor type (i.e., water phase), size, and, in the case of ice crystals, habit (shape).

The most direct method of detecting aircraft icing conditions using the passive polarimetric microwave radiometer is detection of supercooled (i.e., temperature less than 0° C.) liquid water droplets. This can be accomplished by passively detecting the radiation naturally emitted and scattered by water droplets and ice crystals in the atmospheric spectral region at frequencies up to ~1000 GHz. FIG. 5 presents the atmospheric absorption spectrum up to about 220 GHz for atmospheric conditions and altitudes conducive to aircraft icing conditions. Frequencies in the region of 80 to 150 GHz are found to produce optimal scattering signals for typical hydrometeor occurrences.

Icing conditions occur at nearly all flight altitudes, but are most common and most persistent and severe at altitudes below ~5,000 meters (~600 millibars of pressure altitude). The most hazardous conditions usually occur between −5° C. and −15° C. Colder temperatures allow relatively little supercooled liquid to exist. As can be seen in FIG. 5, the presence of cloud liquid water droplets induces changes in the spectrum that are detectable by microwave radiometers. Additionally, atmospheric spectral line features of varying absorption offer the capability of determining the range to the origin of the signal. Because hydrometeors occur as ice-phase as well as liquid-phase droplets, and because some of the liquid phase microwave observables are similar to those generated by some occurrences of ice phase, a number of measurement types may be employed to discriminate between liquid and ice phase hydrometeors and thus to unambiguously detect the presence of icing conditions. These measurements are either polarimetric or spectral, or both, in nature. The radiometer signal can originate in part from the Earth's surface (making the incident microwave fluxes polarized and anisotropic) and in part from the cold of outer space (making the incident fluxes unpolarized and isotropic).

In addition to the airborne application described above, this invention can function as a ground-based aircraft icing detection system by scanning the region from the horizon upward and at any or all azimuth angles. Thus, for instance, locating this invention in a suitable high location at an airport or other landing site would enable one system to service all aircraft utilizing that airport or other landing site.

BRIEF DESCRIPTION OF THE DRAWINGS

FIG. 6 illustrates in tabular form the characteristics of the first two Stokes parameters ($S_o$ and $S_1$) for various meteorological conditions;

DETAILED DESCRIPTION

Atmospheric Radiation and Passive Detector Systems

Figure 1A:
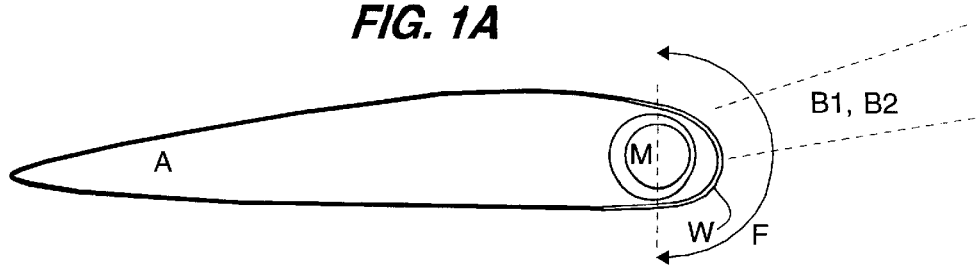
FIGS. 1A and 1B illustrate side cross-section and top cross-section views, respectively, of a simple wing-mounted version of the present passive polarimetric microwave radiometer with vertical scanning capabilities.

The Earth's atmosphere emits thermal radiation in all wavebands which consists of blackbody radiation from both atmospheric atomic and molecular constituents. This emitted thermal radiation is reabsorbed, scattered, and re-emitted by these atomic and molecular constituents and by particulates such as aerosols and hydrometeors (i.e., water as either liquid droplets or frozen snow, ice, or graupel particles). The absorption spectrum of the clear atmosphere in the microwave signal region from 10 GHz to about 220 GHz is shown in graphical form in FIG. 5. This absorption spectrum is calculated at 100% relative humidity for flight altitudes of 850 millibars (about 5,000 feet) and 700 millibars (about 8,000 feet), typical of altitudes at which aircraft icing is encountered. The prominent peaks in this spectral region are caused by absorption lines or, equivalently, emission lines, of atmospheric water vapor and oxygen. Regions of the spectrum between these peaks have lower signal absorption and therefore allow viewing to greater distances; these regions are called "transmission windows." The amount of thermal emission of the atmosphere is equal to the total amount of absorption for a nonscattering atmosphere in thermodynamic equilibrium. Accordingly, the clear-air brightness temperature contribution from a given layer in the atmosphere is:

$$T_b(z,\upsilon) = T_{atm}(z)[1 - e^{-k_{abs}D_z sec(\upsilon)}] + e^{-k_{abs}D_z sec(\upsilon)} T_b(z+D_z,\upsilon)$$

for both vertical and horizontal polarization, where U is the observation angle (with respect to zenith), $D_z$ is the layer thickness, $k_{abs}$ is the absorption coefficient (in nepers/unit length) within the layer, $T_b(z, \theta)$ is the net radiation intensity, called "brightness temperature" in microwave radiometry, at altitude h viewed at angle $\theta$, and $T_{atm}(z)$ is the atmospheric (kinetic) temperature at altitude z. The brightness temperature is measured in units of degrees Kelvin. A perfect emitter ($k_{abs}$ approaching infinity) radiates a brightness temperature equal to its physical (or, kinetic) temperature.

In the presence of hydrometeors, the emission is further modified by the electromagnetic scattering of radiation, and the contribution from a given layer becomes:

$$T_b(z,\upsilon) = T_{atm}(z)[1 - e^{-k_{abs}D_z sec(\upsilon)}] + e^{-k_{abs}D_z sec(\upsilon)} T_b(z+D_z,\upsilon)$$
$$+ k_{scat} S T_{b,a}(z+D_z/2, \upsilon') P_a(\upsilon, \upsilon') d\upsilon'$$

where a is a polarization index (a=v or h for the two fundamental polarizations—vertical or horizontal, respectively), $k_{scat,a}$ is the scattering coefficient (in nepers/unit length) within the layer for polarization a, $k_{ext}$ is the extinction coefficient (the sum of absorption and scattering coefficients, in nepers/unit length), and $P_a(\upsilon, \upsilon')$ is the dimensionally reduced normalized phase matrix for polarization a. For non-spherical cloud particles, $k_{scat,a}$ and $P_a(\upsilon, \upsilon')$ are different for distinct polarizations. Accordingly, from the above it is seen that the brightness temperature contributions from a cloud layer of non-spherical particles can also be different for vertical and horizontal polarization.

A dual-polarimetric radiometer measures the incident microwave radiation intensity, converted to the units of brightness temperature in degrees Kelvin, in each of the two linear polarizations v and h. The polarization vectors for these radiation fields are defined with respect to the natural polarization basis of the Earth as follows:

$$h = (v \times k)/|v \times k| \text{ and } v = k \times h$$

where v is the local zenith vector and k is the direction of view. The average brightness temperature between the two polarizations is defined as $S_o = (T_{b,v} + T_{b,h})/2$ where $T_{b,v}$ is the brightness in the vertical polarization and $T_{b,h}$ is the brightness in the horizontal polarization. $S_o$ is recognized as the first (non-modified) Stokes parameter. This average brightness temperature is typically very cold when viewing above the horizon at most millimeter-wave (mmw) frequencies, the precise values of which depends greatly on the specific frequency, altitude of observation, the amount of moisture in the atmosphere, and the presence of hydrometeors. Radiometer frequencies in excess of 1,000 GHz offer sufficient penetration of the atmosphere for sounding of background meteorological information related to icing conditions (i.e., temperature and humidity profiles), but scattering effects (which increase at roughly the $4^{th}$ power of frequency), limit practical application to icing detection to below about 380 GHz.

The difference between vertically and horizontally polarized radiation intensity is defined as $S_1 = T_{b,v} - T_{b,h}$, and is the second (non-modified) Stokes parameter. This parameter provides one of three important measures of the degree of polarization of the radiation field. There are two additional Stokes parameters ($S_2$ and $S_3$) that define the correlation of vertical and horizontal electric field amplitudes. The three parameters $S_1$, $S_2$, and $S_3$ collectively provide a complete measure of the total amount and type of polarization of the radiation field, although the parameters $S_2$ and $S_3$ are less pertinent to icing detection than $S_1$.

Horizontal Observations at Flight Altitude

Icing detection at flight altitude (as opposed to higher or lower altitudes) is critical because most hazardous icing conditions are stratified with little vertical extent, and the performance characteristics and normal operating modes of most aircraft, especially if already carrying airframe ice, limit ascent/descent angles to at most several degrees. Although severe icing conditions associated with the strong vertical motions of cumulus and cumulonimbus clouds can exhibit a large vertical extent, the limited horizontal size of the updraft region diminishes the total amount of icing that can accrue during penetration of such clouds. Determination of icing conditions is therefore most useful along the horizontally projected flight line. Near-horizontal observations of brightness temperature are thus valuable for the detection of aircraft icing conditions because they provide information on clouds at the projected flight altitude.

The observed brightness temperature in a nonscattering atmosphere (no hydrometeors or large particulates) in any horizontal direction is approximately equal to the physical air temperature at the flight altitude ($S_0 = T_{ambient}$) and is also unpolarized ($S_1 = 0$). This microwave flux is characteristic of the flight altitude temperature, and falls in the range of 258 degrees K to 268 degrees K (i.e., −5° to −15° C.) for altitudes typical of aircraft icing conditions. Deviations from these "nominal" values of brightness temperature can only be caused by nonstratification of the horizontal temperature distribution field in the field of view, the presence of scattering (as opposed to emission) of radiation, and/or non-zero antenna beam width (which adds contributions to the measured radiation field from directions other than the horizon. Unless there is structure in the temperature field due to, e.g., a frontal boundary or strong convective upwelling or downwelling (as in a thermal column or microburst), very little information other than the ambient temperature can be obtained from radiometric observations of clear-air emission in the horizontal direction. If hydrometeors are present, however, perturbations to the brightness temperature and polarization caused by scattering and emission are superimposed on the clear-air horizontal emission flux (as previously described) and offer information on the amount and type of hydrometeors). The characteristics for the first two Stokes parameters for various meteorological conditions are summarized in the "Viewing Horizontally" columns of the table of FIG. 6. Detection and interpretation of such near-horizontal scattering and emission signatures from clouds is part of this passive polarimetric microwave radiometer.

Vertically Scanned Observations

The clear-air background brightness temperature varies as a function of elevation angle, being dominated in window regions by the cosmic background temperature of 2.73 K above the horizon, the flight altitude temperature at the horizon, and the Earth's surface temperature below the horizon. Because of this background variation, the first and second Stokes parameters exhibit a rapid and well-determined variation as a function of elevation angle. Information on intervening hydrometeors is manifested as departures from this normal angular brightness temperature profile, and can be sensed through vertical scanning. In addition, because the vertical structure of temperature and cloud fields is related to icing conditions, vertical scanning of the field of view of the radiometer can produce additional information about the meteorology and possible icing conditions in the vicinity of the aircraft and its flight path.

Vertical scanning can be accomplished by, but not limited to, articulating the antenna system, by articulating a mirror or subreflector, by electronically steering an antenna array, or by utilizing a focal plane array and associated lens that spans a range of vertical and/or horizontal angles. The antenna and focal plane array can be constructed of monolithic microwave integrated circuitry (MMIC) devices to reduce size and cost while improving receiver performance. Horizontal scanning can be accomplished by these same mechanisms. Simultaneous horizontal and vertical scanning can be accomplished with a 2-dimensional array of horizontally and vertically polarized MMIC radiometer receivers that cover the focal plane to the desired angular width of the field of view. Alternatively, a horizontally polarized vertically oriented linear array adjacent to a vertically oriented vertically polarized linear array postioned on the focal plane behind a transversely translated lens can observe a 2 dimentional field of view. Radiometer calibration by viewing external blackbody targets can also be integrated together with the scanning system to minimize complexity of the mechanism.

When viewing below the horizon in clear air and within a spectral window region, the first Stokes parameter $S_o$ is typically quite warm because of the contribution from warmer altitudes and the Earth's surface, although this temperature depends on the amount of moisture in the atmosphere, observation frequency, altitude, and surface type and roughness (ocean or lake water and state, dry soil, moist soil, amount of vegetation cover, snow cover, and the like). The variation in the first Stokes parameter $S_o$ from above to below the horizon can be as large as ~300 K at highly transparent microwave window channels over a warm land background. A baseline "clear air" value for the first Stokes parameter $S_o$ for any vertical angle can be computed using prevailing meteorological information and in-situ measurements of temperature and humidity on the aircraft to better than ~4 K accuracy under typical conditions of temperature and moisture, and ~10 K accuracy under most other conditions. Differences in the first Stokes parameter $S_o$ from the clear-air value observed looking upward are indicative of clouds overhead, and this information can be used to refine the interpretation of the forward-looking brightness temperatures with regard to the presence of supercooled liquid.

Observations near and immediately above the horizon provide sensitivity to supercooled liquid droplets by the following mechanisms. The flux from above the horizon originates from the cosmic background radiation field and has a cold and precisely known temperature of 2.73° K. This flux is warmed somewhat by emission and scattering from liquid or ice clouds above the flight level. For window regions, the first Stokes parameter $S_0$ above the horizon are significantly greater than the clear air case because of the strong emission of water, and only slightly warmer than the flight altitude temperature when viewing below the horizon. At frequencies of high absorption (outside window regions), the first Stokes parameter $S_0$ when viewing above the horizon is only slightly warmed above the expected clear air value because the radiation in such opaque channels originates from lower (and hence) warmer altitudes rather than from colds space. Conversely, when viewing below the horizon, the value of the first Stokes parameter $S_0$ outside window regions is cooled relative to the expected clear-air value.

The polarization difference $S_1$ is normally zero when viewing above the horizon in clear air at frequencies from ~1 GHz to ~1,000 GHz. When viewing below the horizon, the polarization difference can range considerably depending on the type of surface, viewing angle, and frequency. The difference when looking below the horizon in a window region is positive for most surface types, being that the reflectivities of most rough natural surfaces are greater for horizontal polarization than vertical. This difference in reflectivity is partly a consequence of the differences in Fresnel reflectivities for vertical versus horizontal polarization for dielectric surfaces of natural materials. One consequence is that the upwelling polarization difference signature $S_1$ is highly variable, and can range from zero over rough dry soil or dense vegetation to over 125 degrees K over calm water. Because the contribution from the surface can be difficult to characterize,—and therefore remove from the atmospheric signal—it is more desirable to utilize wavelengths outside of the most transparent spectral window regions to observe hydrometeor signatures at viewing angles below the horizon. Accordingly, one embodiment of this passive polarimetric microwave radiometer utilizes frequencies around the three such absorptive regions: the oxygen absorption complex at ~50–56 GHz, the oxygen absorption line at 118.750 GHz, and the water vapor absorption line at 183.310 GHz. Conversely, for observations at or above the horizon, window regions give longer optical paths and therefore greater polarization signals. Suitable compromises between high absorption and high scattering signal exist in the vicinity of the window regions at 89, 140, 220, and 340 GHz.

Figure 8:
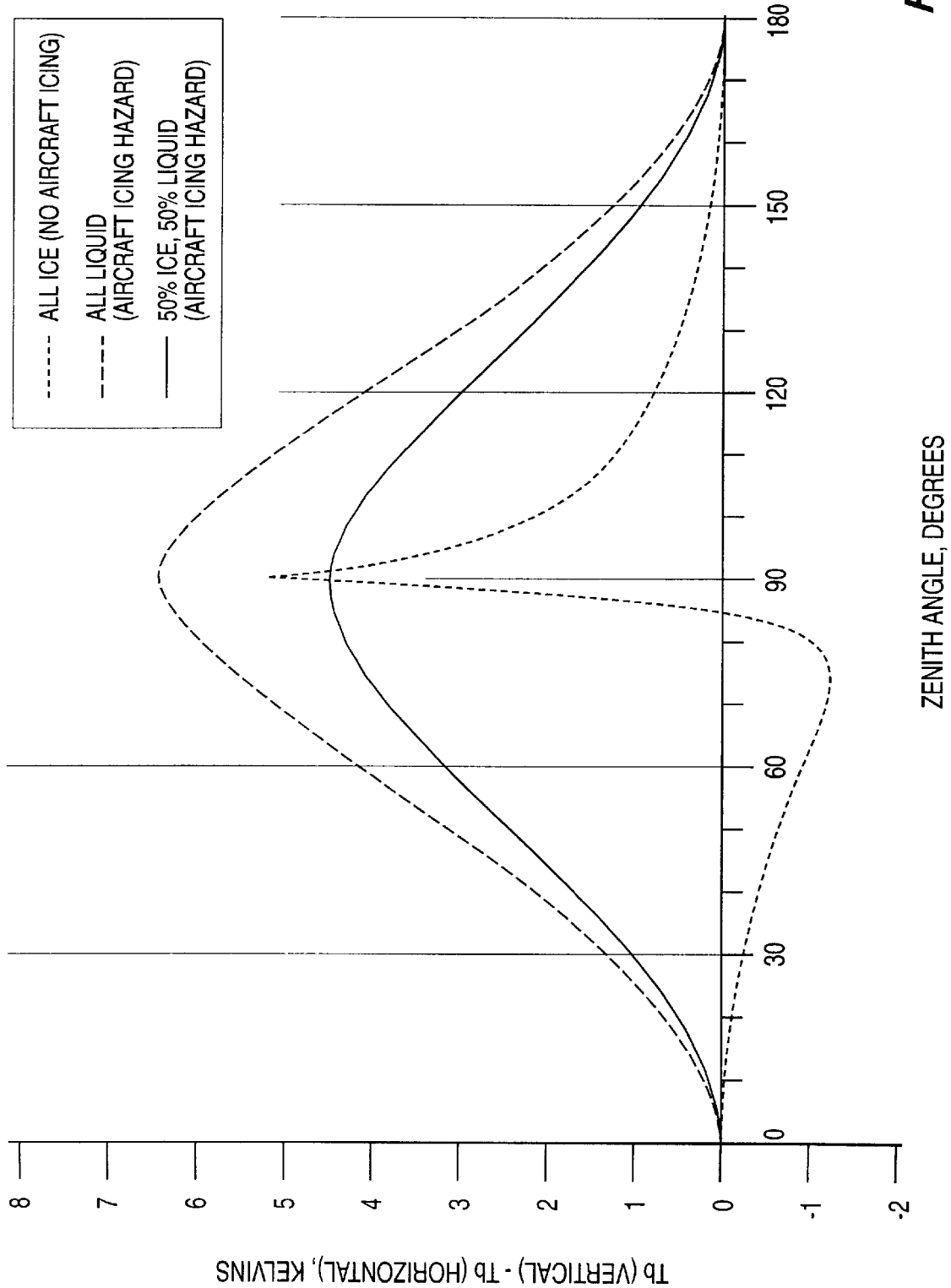
FIG. 8 illustrates the difference in microwave power, or brightness temperature, (the second Stokes parameter) between the vertical and horizontal polarizations as a function of viewing elevation angle for aircraft icing and non-icing conditions.

The total flux incident on hydrometeors is anisotropic for the following reason. Flux incident from horizontal directions originates from around the flight altitude, or about 260K. Downwelling flux originates from the direction of the cold cosmic background at 2.73° K., and is warmed somewhat by intervening atmospheric constituents and hydrometeors. Upwelling flux originates from the Earth's surface, in the vicinity of 290° K. The sum of the upwelling flux and downwelling flux is colder than the horizontally incident flux. This anisotropic flux results in a positive second Stokes vector when scattered from spherical hydrometeors (e.g., liquid droplets) and when viewed in a near-horizontal direction. For nonspherical hydrometeors (i.e., ice)—which are preferentially oriented horizontally—the scattered signal is more complex. According to Kirchoff's radiation law and detailed balancing, if flux from a cool source propagates through a warm scattering medium the scattered components are enhanced in temperature because emission from the warm medium scatters back into the propagation vector in accordance with the angularly dependent scattering amplitudes of the hydrometeors. Conversely, if a flux originating from a warmer source propagates through a cooler medium, the totality of scattered and emitted components are depleted in temperature. Therefore, for viewing angles above the horizon (against the colder background), more horizontally polarized flux is added into the signal by scattered upwelling radiation. Thus, the second Stokes parameter is negative. When viewing below the horizon and against a warmer background, horizontal polarization is scattered out of the background flux, resulting in a more highly positive value of $S_1$. FIG. 8 illustrates the difference in microwave power, or brightness temperature, (the second Stokes parameter) between the vertical and horizontal polarizations as a function of viewing elevation angle for aircraft icing and non-icing conditions.

So, when clouds are present along the direction of view the brightness temperature and polarization signatures change as follows. First, if the clouds are primarily liquid water droplets (rather than ice), then they consist mostly of spherical particles that scatter and emit radiation without regard to polarization, but are illuminated by an anisotropic flux. Thus, when viewing in the angular region near the horizon (within ~15° of horizontal), $S_1$ is positive. If the clouds consist of particularly large liquid droplets (i.e., greater than ~200 microns in diameter), two effects on the signature occurs. First, the occurrence of large liquid droplets only exists as the result of droplet coalescence of a degree associated with rain, and indeed, the large droplets are falling as rain. Rain is not associated with aircraft icing unless it is falling into a freezing layer. Such a situation typically results in an obviously large increase in the observed brightness temperature in both $T_{b,v}$ and $T_{b,h}$ when viewed looking above the horizon, and a moderate decrease in observed brightness temperature when looking below the horizon. Second, very large liquid droplets (>1,000 microns) take on a slight oblateness in their shape as they fall due to the aerodynamic forces on deformable falling bodies. The oblateness results in a polarization signature at opaque frequencies wherein the horizontal brightness temperature can become (depending on the rain cell thickness) several degrees higher than the vertical when viewing above the horizon, producing a negative value of $S_1$. This signature could be misinterpreted as an ice signature except that the overall warming as seen in $S_o$ is obviously large.

If the clouds consist primarily of ice particles, several differences affecting the transfer of radiation takes place. First, for the same densities of cloud water, ice particles do not emit as much as liquid particles. Thus, the unpolarized component $S_0$ of the brightness temperature from particle emission is smaller for the case of ice than for the liquid cloud case. Second, the polarized scattered component of brightness from the Earth when viewing below the horizon is more noticeable since the ice particles do not absorb as much of the polarized Earth signature as would liquid particles. Thus, $S_1$ is larger. Ice particles are generally highly structured and include voids and dendritic growths, and their densities are therefore lower and dimensions larger. Because Rayleigh scattering increases as particle diameter to the fourth power, scattering is also enhanced (relative to an equivalent liquid ice particle) by this increase in size. Third, the ice particles are non-spherical, and typically take on the form of plates or needles as they fall. The plates, in particular, tend to align themselves with their normal axis in or near the vertical direction. These plates thus scatter horizontally polarized radiation more strongly than vertically polarized radiation. The result is that for viewing in the region just above the horizon the horizontal polarization increase is warmer than for the vertical, and the tendency thus is to decrease $S_1$ relative to that for liquid droplets, and for $S_1$ to be negative.

If the clouds are mixed liquid and ice phase, which is most often the case for aircraft icing conditions, the ice crystals tend to be larger than the coexisting water droplets by a factor of 2 to 10. However, the amount of absorption by water—as seen in $S_o$—outweighs the effect of the ice scattering signature—as seen in $S_1$.

Thus, for mixed phase clouds, the first Stokes parameter is increased, while the second Stokes parameter behaves approximately as liquid.

Variations in the measured brightness temperatures due to clouds not only exhibit average ($S_0$) and polarization difference ($S_1$) characteristics, but also exhibit important spectral characteristics depending on the mean sizes of the water particles. For small particles, the scattering characteristics increase approximately as the frequency to the fourth power. Thus, from ~55 GHz to ~118 GHz the scattering signature increases twenty-fold, and from 55 GHz to 180 GHz over one hundred-fold. This Rayleigh scattering relationship holds to an acceptable approximation provided that the average ratio of particle size to wavelength is less than ~1/10 for water and 1/5 for ice. Thus, for 180 GHz, the particles must be of mean size less than about 200 microns. For liquid droplets whose sizes are in the range that is able to cause aircraft icing (20 to 200 microns), the scattering difference signature at these two bands is large. On the other hand, for larger raindrop-sized particles (i.e., of size exceeding the Rayleigh criterion) the scattering characteristics become more independent of frequency, and the spectral difference signature becomes smaller.

In addition to cloud information, temperature profiles proximate to the aircraft can be measured by observing the first Stokes parameter $S_0$ at an opaque frequency over a range of angles from zenith to nadir. The variation in brightness can be mathematically inverted for both the local temperature profile and a lapse rate to accuracies of several tenths of a degree C per kilometer. For example, at ~60 GHz, where scattering from cloud droplet sized particles is not significant, and at a flight pressure altitude of 700 millibars, the temperature profile and lapse rate from ~800 meters below to ~800 meters above the aircraft can be accurately measured by vertical scanning. Hazardous icing conditions correlate with low lapse rates (i.e., stratification, as occurs along with a slow decrease of temperature with altitude). The broad peak in absorption near 60 GHz allows a wide IF bandpass (~4 GHz), giving the radiometric receiver high radiometric accuracy over short observation times. The resolution of such a 60 GHz radiometer for a one-second observation time is better than 0.02° C. Typical atmospheric lapse rates are ~2° C. to ~10° C. per kilometer of altitude.

Cloud electrification leading to lightning strokes can also be detected radiometrically. Such electrified regions are a result of atmospheric convection of mixed-phase (ice and liquid) hydrometeors, and are thus associated with icing conditions. In the presence of high electric fields that exist just prior to lightning discharges, the frozen hydrometeors align their long dimension with the electric field. The preferred orientation of these hydrometeors produces a change in the value of $S_0$ and (depending on the orientation of the electric field within the cloud) a nonzero value of $S_1$. The lightning discharge tends to neutralize the electric field in the vicinity of the stroke, inducing a sudden change in these two Stokes parameters. Abrupt changes in the time series of the spatial distribution of these parameters thus identify regions of electrification, and hence potential icing and high turbulence conditions.

Use of 60 GHz and 183 GHz Frequency Regions

Figure 5:
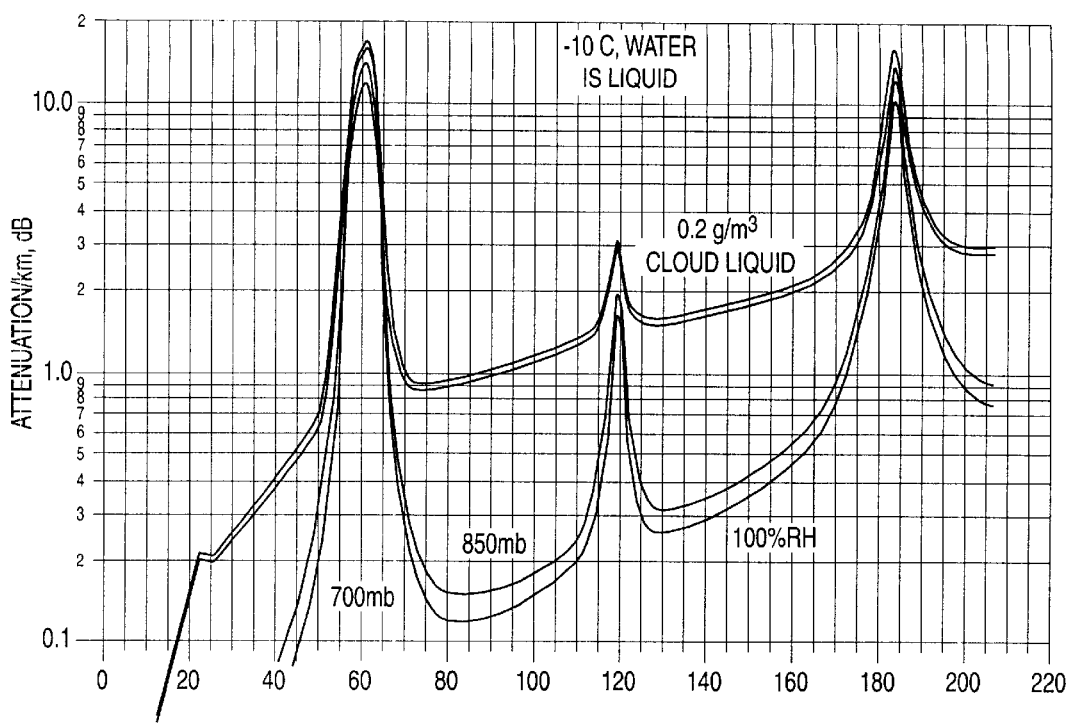
FIG. 5 shows the absorption spectrum of the atmosphere between 0 GHz and 300 GHz and at several altitudes for several meteorological conditions, including the similar intensities of absorption around the 60 GHz oxygen band and the 183 GHz water vapor line.

Icing conditions occur at nearly all flight altitudes, but are most common, persistent, and severe at altitudes below 5,000 meters altitude (~600 millibars of pressure altitude). The most hazardous conditions usually occur between −5° C. and −15° C. As can be seen in FIG. 5, for clouds in this range of altitudes and at these temperatures, the absorption at the 183.310 GHz water vapor line is approximately of the same magnitude as that at the assemblage of oxygen lines centered at 60 GHz. The attenuations of these two spectral features therefore span the same values from line center out onto the wings of the lines, and therefore have parallel capabilities of ranging the radiometer observations through tuning the radiometer from either the band or line center outward onto the wings. The Rayleigh scattering of radiation at these two frequency bands is, however, quite different. The amplitude of scattering in the Rayleigh regime is nearly two orders of magnitude greater at 183 GHz than at 60 GHz. Therefore, by utilizing polarimetric observations near these two lines at frequencies with matching attenuations (and therefore matching range sensitivities) a stronger spectral signal providing information on hydrometeor habitat (size and shape) can be obtained. Such additional information is especially important for characterizing volumes containing mixed phases of liquid water and ice (wetted ice crystals, or interspersed ice and liquid hydrometeors) and for determining hydrometeor shapes and size distributions.

A simplified radiometric receiver could be constructed, for instance, by downconverting the RF signals from the antenna with local oscillators centered at around 60 GHz and 183 GHz, and using filter banks to separate out baseband sidebands into a plurality of frequency intervals at various frequency separations from the local oscillator frequency, thus obtaining radiometric sensitivities with a variety of differing weighting functions, and therefore range sensitivities.

Summary of Observed Signatures

Figure 7:
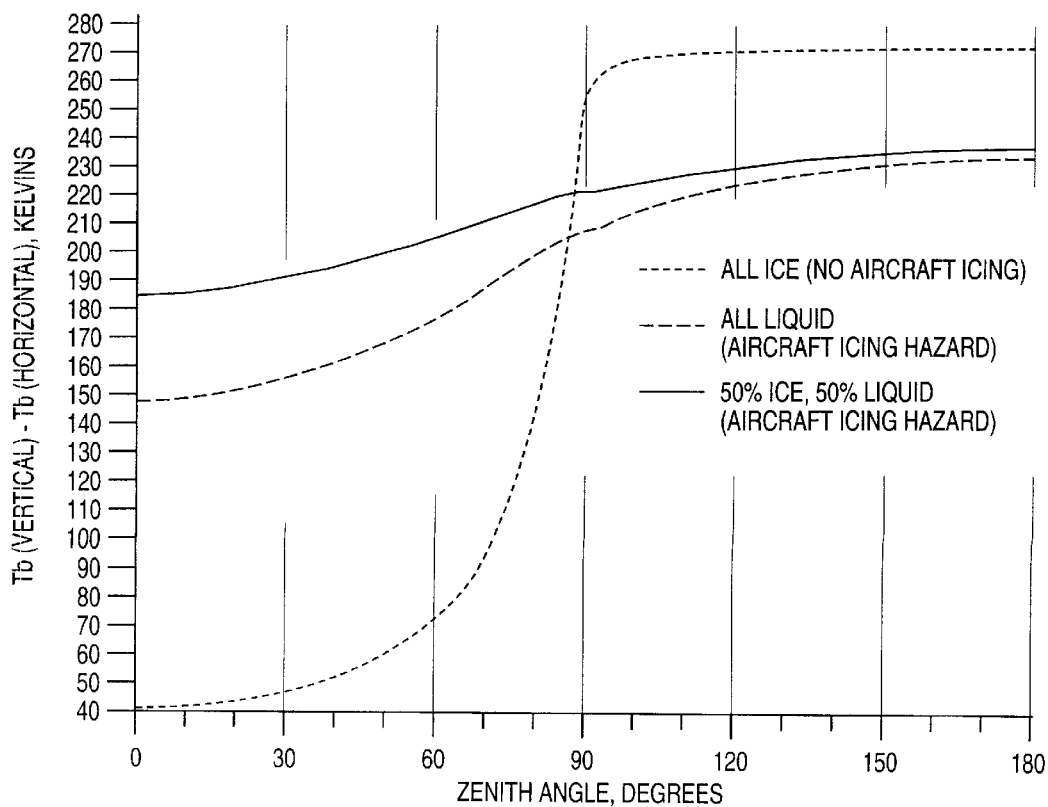
FIG. 7 illustrates the microwave power, or brightness temperature, (the first Stokes parameter) as a function of viewing elevation angle for aircraft icing and non-icing conditions.

FIGS. 7, 8 present values of the first and second Stokes parameters $S_0$ and $S_1$, respectively, as a function of the elevation of the viewing angle from an aircraft for typical aircraft icing conditions. The table of FIG. 6 summarizes the effects of clouds on the average brightness given by the first Stokes parameter $S_o$, polarization difference $S_1$, and spectral difference for observations both at horizontal and above and below horizontal. One additional key parameter needed to determine the potential for icing is the cloud temperature. This parameter can be obtained in flight in either of three ways: (1) the air temperature can be measured in-situ, then adjusted using a standard lapse rate for the assumed altitude of the observed cloud, (2) the air temperature at the cloud altitude can be obtained from information on the prevailing meteorological conditions (e.g., from nowcasts or numerical models), or (3) the temperature can be measured remotely using vertical radiometer scans at an opaque region of the spectrum such as the 60 GHz oxygen absorption complex, or the 118.75 GHz oxygen absorption line. The potential for icing exists if a temperature within the range of freezing (0° C.) to −30°C. is determined, with a higher potential if in the range of −5° to −15° C.

A measurement of stratiform cloud thickness also impacts the interpretation of the passive signature information by allowing a determination of the density of the distribution of water. For example, a thin stratus cloud that causes a strong brightness variation is likely to consist of a dense distribution of particles. Statistically, these particles would also likely be large since particle size is loosely correlated with cloud density, thus providing indirect particle size information. Information on the thickness of a stratiform cloud can also be obtained radiometrically by observing the cloud at a number of elevation angles during flight along a straight path. Each observation provides a measure of water content along different cross-sections of the cloud.

Determination of Range to Icing Conditions

Aircraft range to meteorological features such as regions of supercooled liquid water droplets can be estimated from the change in angular size (subtended angle) of the cloud feature as the aircraft approaches. For instance, if a certain feature as observed using either vertical or horizontal scanning changes in subtended angle by 10% while the aircraft moves 1 km toward the feature, the feature is about 10 km distant.

Figure 9:
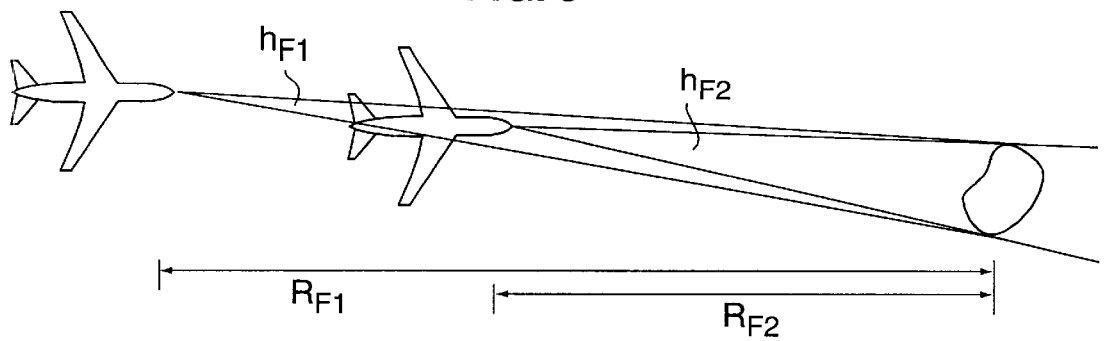
FIG. 9 illustrates in graphical form the change in subtended angle with range.
Figure 10:
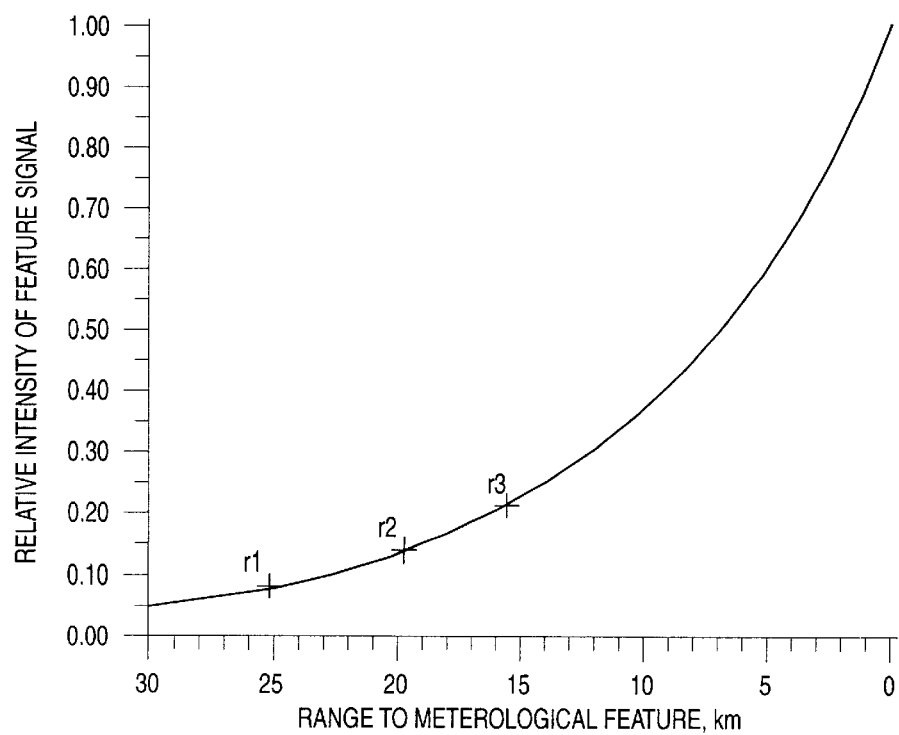
FIG. 10 illustrates in graphical form the determination of range (distance) to meteorological features by analysis of the time series of observed data and application of the Beers-Lambert law.

Range to and magnitude of meteorological features such as supercooled liquid water clouds can also be determined by the strength of the signature in the time series of observed features as the aircraft travels forward. FIG. 9 shows that the radiometer sensitivity decreases in a predictable exponential form with distance from the antenna. For a nearly homogeneous intervening medium, the decrease in sensitivity with range approximately follows the Beer-Lambert law:

$$I = I_0 \exp(-k_{ext} r)$$

where I is the intensity of the desired meteorological feature signal, $I_0$ is the intensity emitted by the feature, $k_{ext}$ is the extinction coefficient of the intervening medium, and r is the range from the radiometer to the feature. The unknown quantity $k_{ext}$ can be determined from in situ measurements by the aircraft, or can be determined by simultaneous solution for $I_0$, r, and $k_{ext}$ of three or more measurements that contain values of I measured at three or more different aircraft positions (r1, r2, r3 in FIG. 10). Thus, the rate of change of the signal strength as a function of distance traveled yields information on the range to such features. Because the extinction and emission spectrum varies with frequency, each radiometer observation frequency can give an independent measure of the three unknown parameters.

Figure 12A:
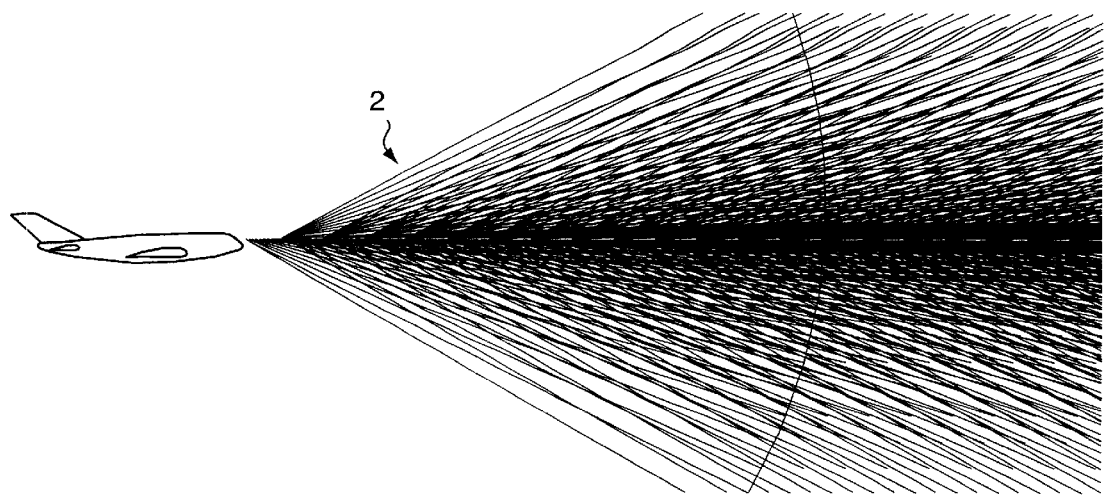
FIGS. 12A and 12B schematically show a side view and a plan view, respectively, of the tomographic intersections of lines of sight of the radiometer antenna as a function of scan angle and of position of an aircraft as it proceeds forward.
Figure 12B:
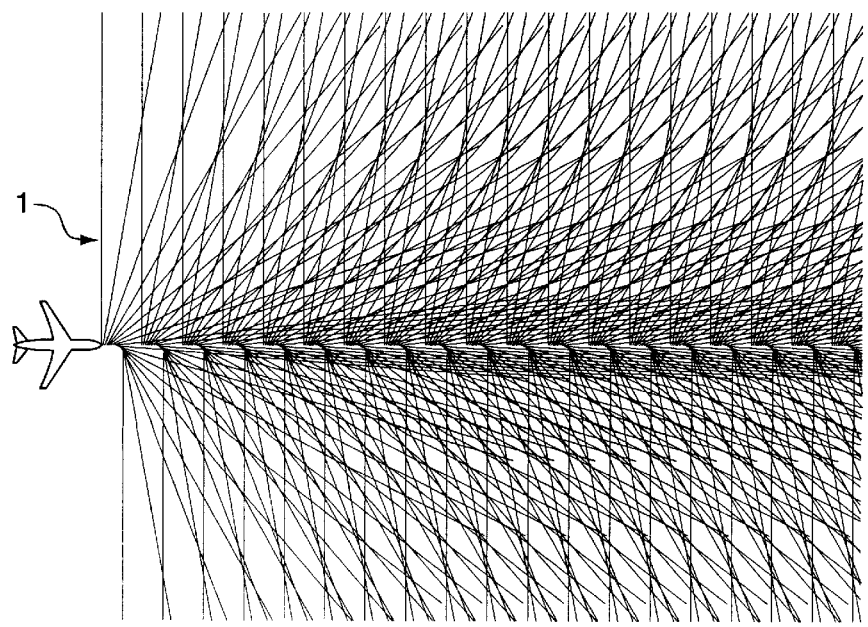
Figure 13A:
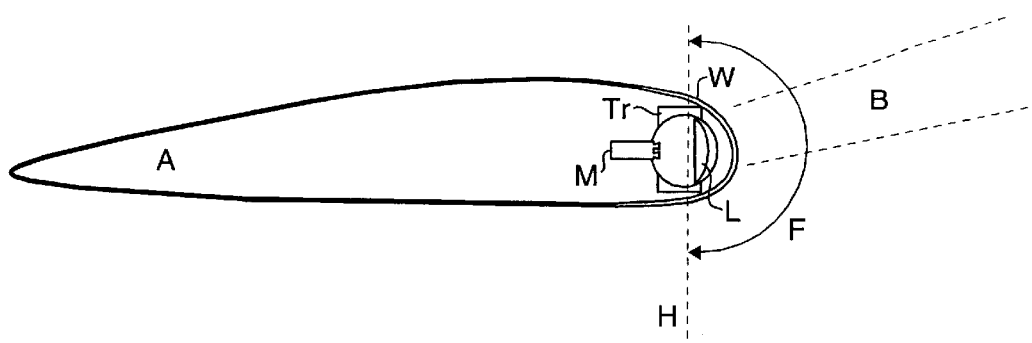
FIGS. 13A–13D illustrate side cross-section and top cross-section views, respectively, of more complex wing-mounted versions of the present passive polarimetric microwave radiometer with scanning capabilities using a focal plane MMIC (monolithic microwave integrated circuit) array of receivers.
Figure 13B:
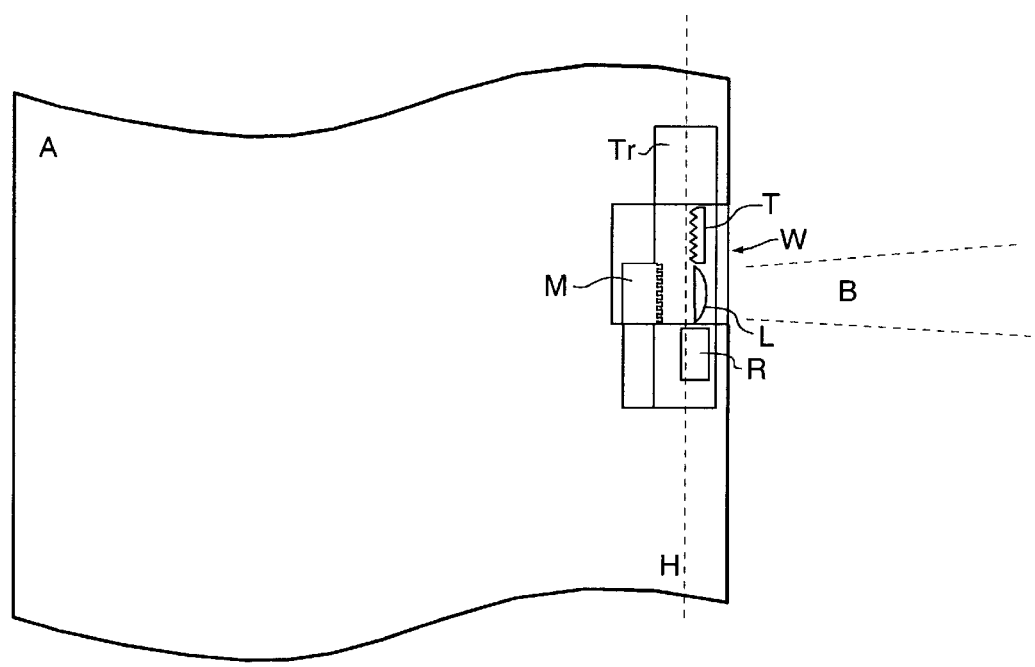
Figure 13C:
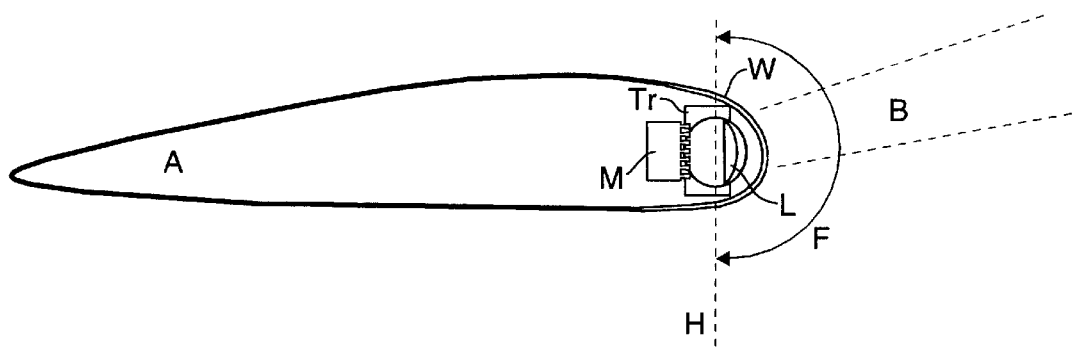
Figure 13D:
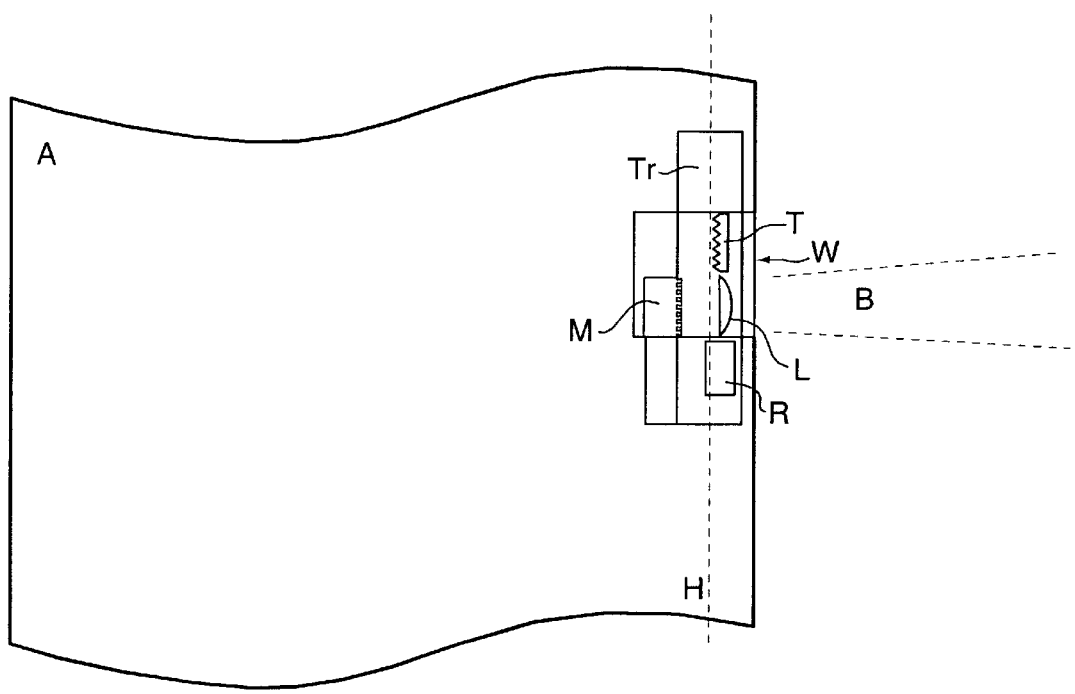

Application of tomographic methods to either horizontal or vertical scanning as in 1 of FIG. 12B can yield the range and magnitude of meteorological features. By scanning in one dimension or plane, tomography can be used to generate a 2-dimensional map of meteorological conditions and provides information on the direction and distance to areas of icing to avoid, as well as can be used to define possible routes of passage or escape. A combination of azimuth (1 of FIG. 10B) and elevation scanning (2 of FIG. 12A) can be used to generate 3-dimensional images of the hydrometeor composition. Tomographic scanning can either be accomplished in incremental steps as is shown diagrammatically in FIGS. 12A and 12B, or continuously. Application of tomographic techniques to the measured signal can be used to infer ranges to features as well as cloud layer thickness and cloud morphological information. Such tomographic techniques are invaluable for otherwise ambiguous situations where regions of different phases are within the field of view of the radiometer.

To further improve reconstruction of spatial distributions of various hydrometeor types and meteorological features, additional information including (but not limited) to climatology, feature size, spectrum, radar reflectivity and attenuation data, and distance ranging from any or all of the ranging methods herein can be amalgamated utilizing data fusion methods such as maximum likelihood, maximum entropy, Bayesian maximum a-priori probability, or similar methods that incorporate a-priori and other information to perform optimal image reconstruction.

Range to icing conditions and other meteorological features can also be determined via the methodology described in U.S. Pat. No. 5,526,676, wherein the differential signal absorption (and therefore range) can be obtained by observing characteristic first and second Stokes parameter signals that are added to existing and predictable spectral features such as the oxygen feature centered at 60 GHz. The attenuation, and therefore range from the antenna, can be modulated by tuning up and down the side of the atmospheric absorption features. The range to the hydrometeor creating the additive scattering signal can therefore be determined.

Passive Polarimetric Microwave Radiometer Implementations

The passive polarimetric microwave radiometer implementations presented here consist of an even more capable (but more complex) aircraft icing detection system that includes two aforementioned simpler implementations utilizing a polarimetric radiometer which operates to monitor a signal of at least one frequency: staring in the direction of flight, and scanning spatially in the vicinity of the forward direction of the aircraft. FIGS. 1–4 illustrate the essential features of such a Forward Scanning Polarimeter (FSP) for use on either a general aviation, commercial, or military fixed-wing aircraft. A rotorcraft-mounted system could also be constructed by implementing the FSP system in an aerodynamic pod or other aerodynamically conformable module with minor physical modifications.

The FSP shown uses two radiometric bands at the microwave frequencies discussed above, and two orthogonal linear polarizations for each band. The entire assembly of the FSP resides in the leading edge of an airfoil wing (A) and views forward through a conformal window (W) formed in the airfoil wing A, similar in shape to an aircraft landing light window. The FSP for rotary wing aircraft is similar to that shown in FIGS. 1–4 except that an aerodynamic shroud replaces the wing surface and the view upwards is limited to angles within ~40 to 50° above the horizon due to occultation by rotating blades. The parabolic antenna reflector R is large enough to provide an antenna aperture of ~20 cm in diameter, thus yielding half-power beamwidths of ~2° and ~1° at 50.3 GHz –55 GHz and 118.75 GHz, respectively. The water vapor absorption line at 183.31 GHz could be used in place of the 118.75 GHz line throughout this embodiment and the half-power beamwidth would then be 0.6°.

Figure 1B:
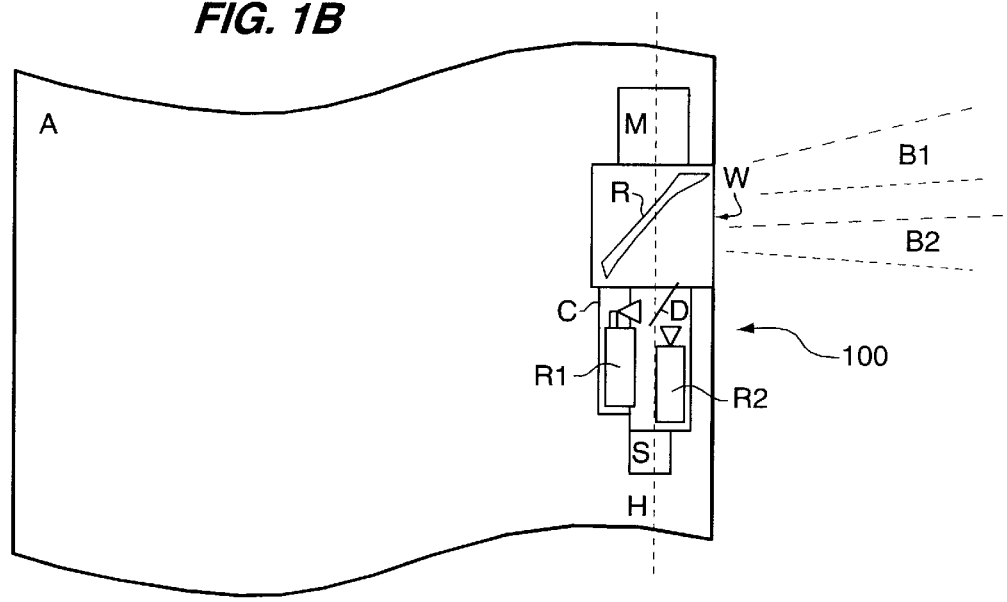

FIGS. 1A and 1B illustrate side cross-section and top cross-section views, respectively, of a wing-mounted version of the FSP with vertical scanning capabilities. In FIGS. 1A and 1B, the present passive polarimetric microwave radiometer 100 is designed to receive signals of two different microwave frequencies (bands B1, B2) wherein received signals are separated using a dichroic band separator plate D. The received signals in each band B1, B2 of different polarization are separated using standard orthomode couplers (not shown) that are part of the respective radiometers R1, R2. Thus the radiometers R1, R2 each include two total power radiometer receivers to detect the signal strength of each signal polarization at the selected band. The 50.3/55 GHz radiometers R1 can use low-noise high-electron mobility transistor (HEMT) monolithic microwave integrated circuit (MMIC) front-end amplifiers and waveguide ferrite switches with ambient and heated terminations for fast internal calibration. Alternately, the 50.3/55 GHz radiometers R1 can use noise diodes and directional couplers to leak a calibration signal into the input. The 118.75 GHz radiometers R2 use a balanced mixer front end with a similar waveguide ferrite switch or crossguide coupler calibration arrangement.

The radiometers R1, R2 view a 45° tilted scanning parabolic antenna reflector R with focal length f/d~1, Which focuses and directs the beams B1, B2 forward in a vertical plane with its normal in a horizontal cross-track direction. The radiometers R1, R2 rotate together on an axially rotatable chassis C along with the scanning parabolic antenna reflector R to maintain polarization integrity throughout the scan. Signals and power are relayed from the radiometers R1, R2 to the aircraft through a standard slip ring assembly S. A stepper motor M rotates the entire assembly around a horizontal axis H to achieve a scan with a period of ~1–3 seconds. The field of view F of a complete scan is shown as being from nadir to zenith.

The horizontal direction of the beam can be changed by +/−15° from the forward direction by nutating the scanning parabolic antenna reflector R up to +/−7.5° using a sliding shaft and bell-crank assembly. The sliding shaft is driven by a linear stepper actuator located along the motor shaft behind the stepper motor. The mechanism thus allows the radiometer beams B1, B2 to be horizontally scanned without polarization mixing, a unique and important feature of this embodiment. The horizontal range of scan can be increased to +/−30° by using an offset scanning parabolic antenna reflector R of slightly larger focal length (f/d~2).

Figure 2:
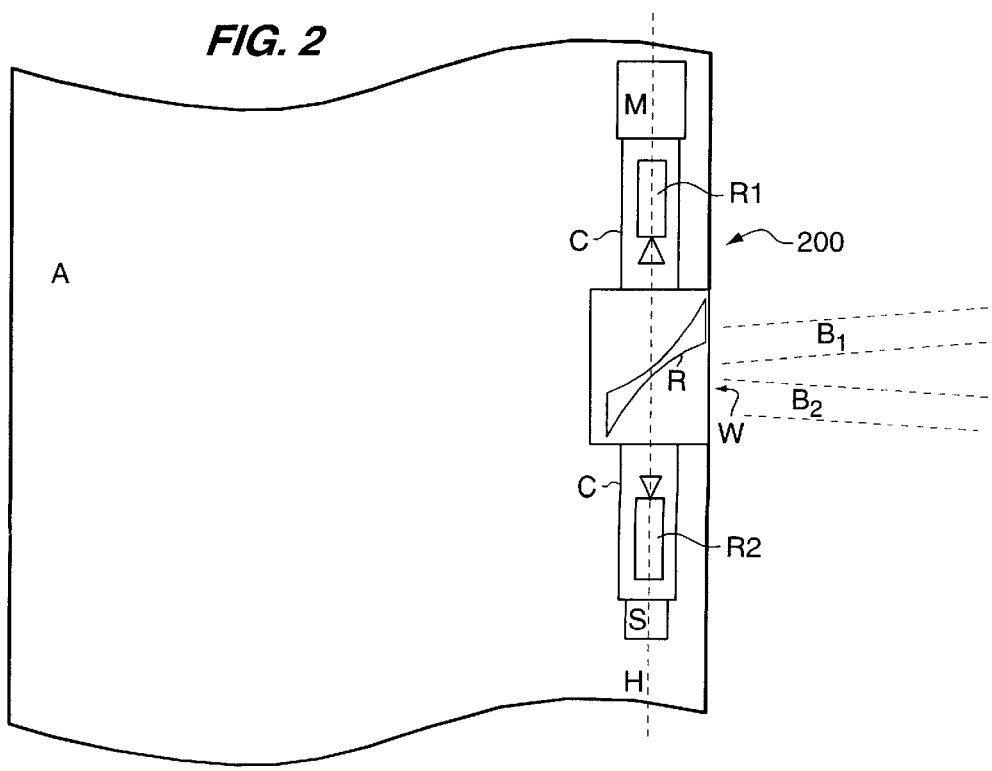
FIG. 2 illustrates a side cross-section view of a simple wing-mounted version of the present passive polarimetric microwave radiometer with a dichroic plate to separate disparate wavebands into two receivers.

Several related but alternate methods to measure polarized brightness temperatures exist. For example, as shown in FIG. 2 the dichroic band separator plate D can be eliminated from the present passive polarimetric microwave radiometer 200 if the two radiometers R1 and R2 are faced opposing each other and viewing the scanning parabolic antenna reflector R from two sides. In this case, the scanning parabolic antenna reflector R would require two parabolic-shaped faces, and the beams ($B_1$ and $B_2$) from the two radiometers R1 and R2 would alternately view in the forward direction. This implementation of the passive polarimetric microwave radiometer 200 has the advantage of a thinner cross section since the radiometers R1 and R2 are each located on the rotation axis H rather than side-by-side.

Figure 3A:
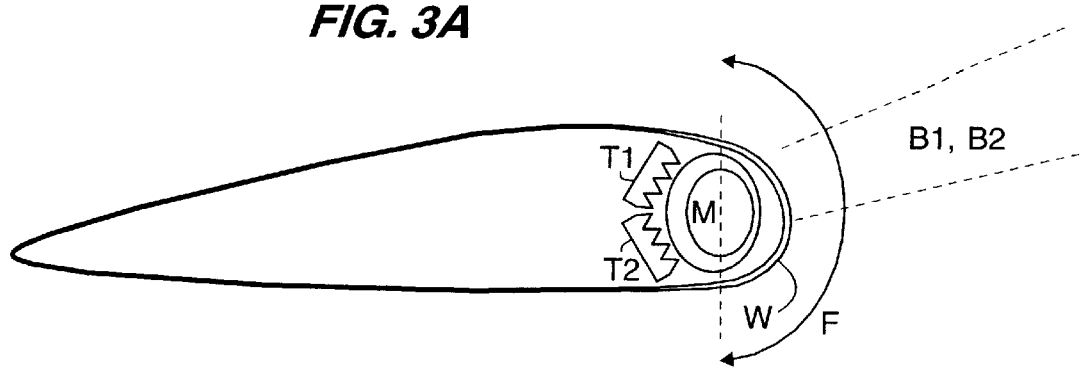
FIGS. 3A and 3B illustrate side cross-section and top cross-section views, respectively, of a simple wing-mounted version of the present passive polarimetric microwave radiometer with blackbody calibration targets external to the antenna system.
Figure 3B:
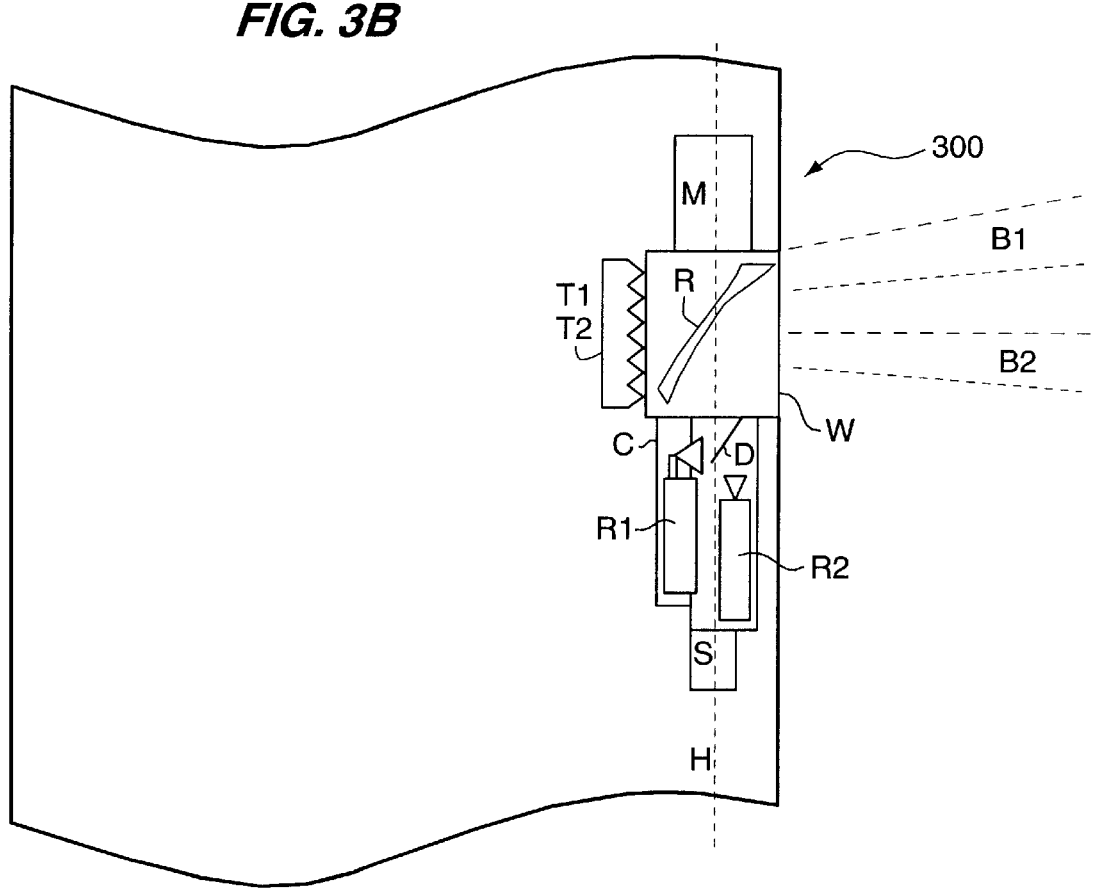

The present passive polarimetric microwave radiometer 300 can also be implemented as shown in FIG. 3 where the waveguide ferrite switches and internal calibration hardware of the radiometers R1 and R2 are eliminated if external hot and ambient blackbody calibration targets T1, T2 are placed aft of the scanning parabolic antenna reflector R and the beams ($B_1$ and $B_2$) are made to view each of these targets T1, T2 once per scan.

Figure 4A:
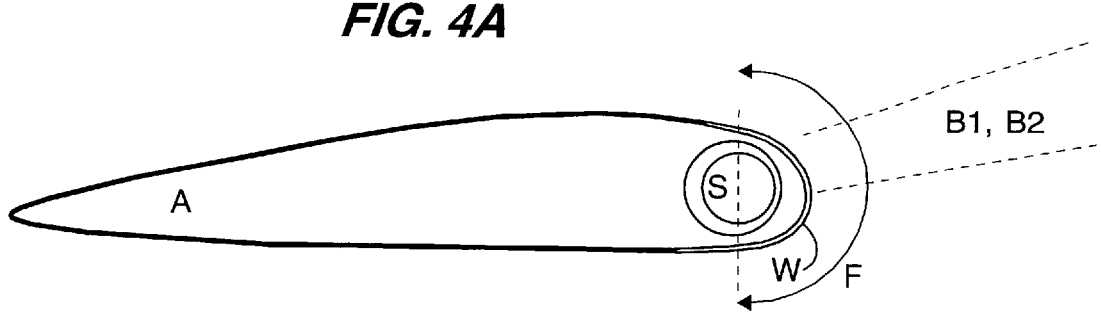
FIGS. 4A and 4B illustrate side cross-section and top cross-section views, respectively, of a simple wing-mounted version of the present passive polarimetric microwave radiometer with Faraday ferrite polarization rotators to switch the polarization of the receiver.
Figure 4B:
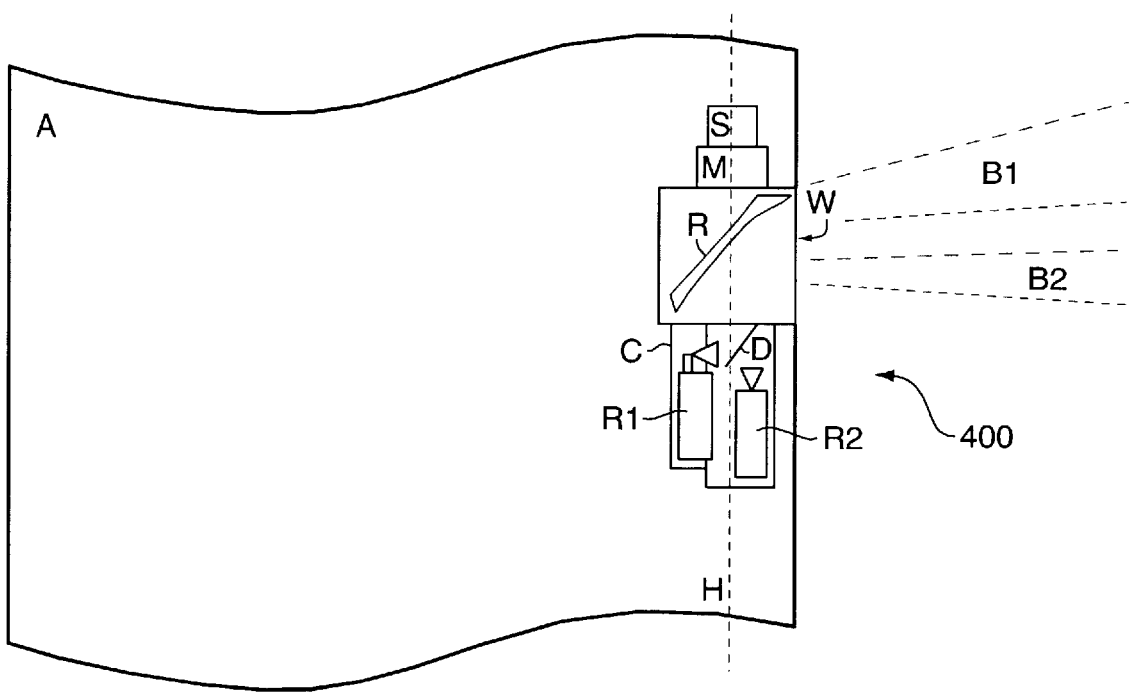

The present passive polarimetric microwave radiometer 400 can also be implemented as shown in FIG. 4 where radiometers R1 and R2 can be fixed to the aircraft frame and decoupled from the scanning parabolic antenna reflector R if ferrite polarization rotators are used. In this case, the ferrite rotators would be synchronized to the scanning parabolic antenna reflector R so that the reflected polarization would be pure linear vertical for one entire scan, then pure linear horizontal for the next, and so on. The resulting series of scans would be polarization interlaced. One consequence of this alternate configuration is less rotational mass and inertia, so that a smaller drive motor M is required. Moreover, the radiometers R1 and R2 would not be subject to the mechanical stresses associated with rotation.

Finally, the present passive microwave scanning radiometer 500 can be implemented using focal plane arrays of radiometer and antenna modules developed from a set of monolithic microwave integrated circuits (MMICs). Such MMICs exist for this application, and can be ganged together and located in the focal plane of a Rexolite™ lens of f/d between 1 and 2. The array can be either one (FIGS. 13A–13B) or two-dimensional (FIGS. 13C–13D) in nature. If two dimensional, the array can perform both vertical and horizontal scanning without any mechanical action. If one-dimensional, the array needs to be nutated in the oppositely oriented plane to implement two-dimensional scanning, but could perform one-dimensional scanning without mechanical action. An alternative to the focal plane array of antennas and receivers would be the equivalent use of an array of antennas switched electronically (e.g., using ferrite devices) into a single receiver. Calibration of the entire array of antenna/receiver channels can be accomplished periodically on an ~15–60 second basis) by a mechanically driven slide mechanism (FIGS. 13A–13D—Tr) that translates the Rexolite™ lens (FIGS. 13A–13D—L) laterally from the array, substituting in the array's field of view a heated and an ambient target (FIGS. 13A–13D—T). The translation mechanism can also side into the field of view a secondary lens and mirror allowing either zenith or nadir views. The embodiment of this icing sensor assumes the possible use of MMIC focal plane radiometer arrays.

The optimum choice of the above alternate configurations depends on the aircraft speed (which influences required integration time and hence the viability of interlaced vertically and horizontally polarized scans), available integration volume within the leading edge of the wing, and cost. For example, the synchronized ferrite rotators are comparable or greater in cost to an aircraft-qualified slip ring and bearing assembly, and relatively expensive to fabricate in quantity and with low insertion loss at 118 GHz. Similarly, while focal plane array modules are relatively expensive compared to single radiometers, their use entails less mechanical hardware and will provide longer integration times, and hence greater sensitivity. The focal plane array configuration could also image fast enough to double as a forward looking millimeter wave camera for takeoff and landing operations in minimum visibility conditions. The passive icing detection radiometer can also be used in a ground-based mode in conjunction with aircraft terminal weather equipment such as terminal Doppler weather radar in the same manner as on an aircraft to improve the detection of icing conditions. The icing information from the passive scanning radiometer would be added to the available terminal information so as to facilitate the issuance of more informed local warnings of near-surface icing.

Algorithms for Icing Detection

The icing detection algorithms utilize the characteristics outlined in the table of FIG. 6. An algorithm for detecting icing conditions utilizing a horizontally looking radiometer would utilize the second Stokes parameter $S_1$ to determine if scattering hydrometeors, when present, are spherical (liquid) or have preferred horizontal structure (ice). The receiver observes at 50.3 GHz and 55 GHz and at 118.75+/−

0.3 GHz and 118.75+/−2 GHz in both the vertical and horizontal polarization. The symmetrical sampling on the sides of the 118.75 GHz line has several advantages. The local oscillator of the microwave receiver can be centered at 118.75 GHz, and the downconverted signal separated into the desired channels by filter banks passing intermediate frequencies of 0.3 GHz and 2 GHz. This is a rather simple and robust radiometric method. Additionally, the dual sideband downconversion makes the receiver insensitive to local oscillator drift because the sidebands straddle the 118.75 GHz line such that local oscillator drift brings one sideband higher upon the shoulder of the line and causes a compensating lowering of the sideband on the other side of the line. The antenna scans in a horizontal direction to the left and to the right of the aircraft centerline. The antenna can also scan in a vertical direction from 90° above the aircraft to 45° below the horizon.

For increased polarization sensitivity a dual polarization receiver at 183.31, 183.31+/−1.6, 183.31+/−2.6 183.31+/−6, and 183.31+/−9 GHz (chosen to have approximately matching attenuations with the channels at 60, 60+/−2, +/−3, 3.8, and +/−4.6 GHz, and therefore the same range sensitivities) could be used in place of the 118.75 GHz receiver. This matching of range sensitivities enables improved sensitivity for the identification of hydrometeor types and ranges, as well as discrimination between spherical ice particles such as graupel and liquid water droplets by the relative brightness temperatures and polarizations. Additional range information on the various hydrometeor types is obtained from processing of the time series of the first and second Stokes parameters.

The precise sensitivity to opacity can be optimized by adjusting the line offset frequencies. For example, lower opacity can be achieved by increasing the filter bank frequency bandpass from 2 GHz to 3 GHz. A plurality of simple filters can be used to optimize the icing detection sensitivity. An example algorithm for detecting icing conditions using multi-frequency angular scanning radiometers utilizes the following: (1) two dual-polarimetric radiometer channels around 50.3 GHz and 55 GHz, (2) two dual-polarimetric double sideband (DSB) radiometer channels at 118.75+/−0.3 GHz and 118.75+/−2.0 GHz, and (3) an in-situ air temperature and humidity sensor. These frequencies are chosen so as to provide channels that probe both close to and far from the aircraft, as well as limit the range of signature by virtue of a moderate amount of oxygen absorption, even for the most transparent of the four channels. The polarimeters are able to view above and below the horizon from ~45° below the horizon to 90° above the horizon by forward vertical scanning. In radar parlance this mode is known as a range-height indicator (RHI) scan. The polarimeters are also able to view to at least +/−20° horizontally in azimuth relative to the forward direction. In radar, this mode is known as a plan position indicator (PPI) scan.

Figure 11:
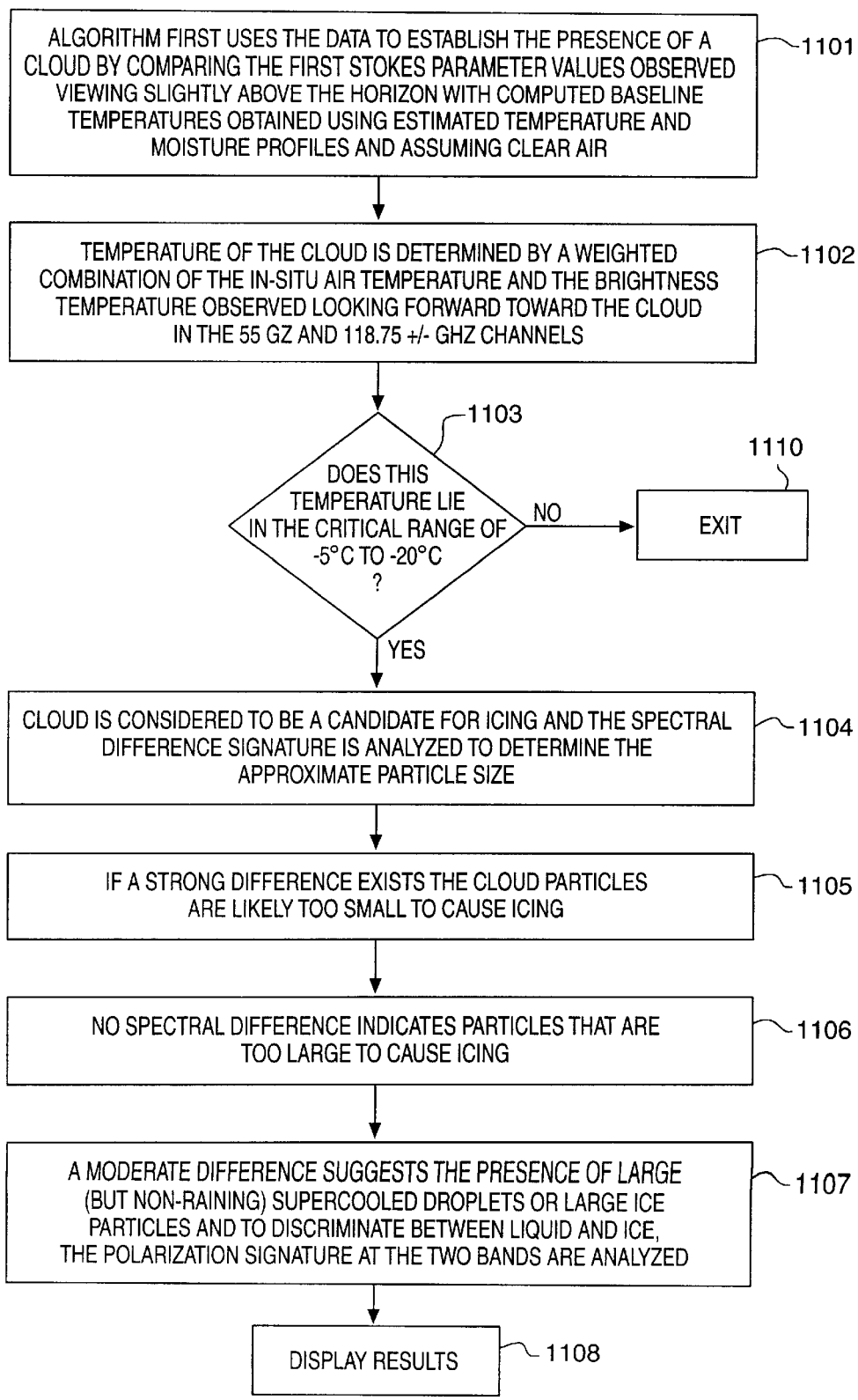
FIG. 11 illustrates in flow diagram form the operational steps taken by the present passive polarimetric microwave radiometer to determine the presence of icing conditions in front of an aircraft.

The operation of the passive polarimetric microwave radiometer is illustrated in flow diagram form in FIG. 11, where at step 1101 the algorithm first uses the data to establish the presence of a cloud by comparing the first Stokes parameter $S_o$ values observed viewing slightly above the horizon with computed baseline temperatures obtained using estimated temperature and moisture profiles and assuming clear air. Since clouds are often inhomogeneous on a scale of ~10 km or less the spatial information obtained from the RHI scan and passage of the aircraft toward the cloud contributes to this detection. The more transparent channels at each band (i.e., 50.3 GHz and 118.75+/−2.0 GHz) are used because of their greater sensitivity to clouds.

The temperature of the cloud is next determined at step 1102 by a weighted combination of the in-situ air temperature and the brightness temperature observed looking forward toward the cloud in the 55 GHz and 118.75+/−0.3 GHz channels. If this temperature lies in the critical range of ~5° C. to −20° C., as determined at step 1103, the cloud is considered to be a candidate for icing. Next, the spectral difference signature is analyzed at step 1104 to determine the approximate particle size. If a strong difference exists the cloud particles are likely too small to cause icing as indicated at step 1105. Likewise, no spectral difference indicates particles that are too large to cause icing as indicated at step 1106. A moderate difference suggests the presence of large (but non-raining) supercooled droplets or large ice particles. To discriminate between liquid and ice, the polarization signature $S_1$ at the two bands are analyzed at step 1107. Liquid droplets should produce a zero or positive value of polarization difference, while ice should produce a statistically smaller or negative polarization difference.

To verify the conditions, a similar (comparable) algorithm would be run for the case of viewing slightly below the horizon. Here, the presence of a cloud would be established by a cooling in the first Stokes parameter $S_o$ for the transparent channels, the temperature established in the same manner as viewing upward, the particle size established by the spectral difference in the transparent channels, and the presence of liquid or ice established by the sign of the change in polarization signature relative to the clear air case.

The above operations are performed in real-time using a modern dedicated embedded PC computer. In practice, the aircraft attitude obtained from an on-board gyroscope, inertial navigation system, GPS-based multiple-antenna aircraft attitude determination system, or other horizontal/vertical reference would be needed to compensate the measured radiometric signals for perturbations caused by rolls and pitches of the radiometric sensor with respect to the horizon. The in-flight humidity sensor is used to periodically calibrate the detection algorithm since a reading of ~95% humidity or greater indicates with high likelihood the presence of a cloud.

The processed data provided by the passive polarimetric microwave radiometer can be made available to the cockpit in several forms, including but not limited to: (1) an icing probability-range indicator, (2) cloud liquid water maps similar to weather radar PPI indicators (from the tomographic technique) and capable of being displayed on existing aircraft weather radar displays, and (3) audible warnings of imminent icing conditions. Icing probabilities can be binned into one of a small number of easily distinguishable classes (e.g., clear, potential, moderate, and severe), thus allowing pilots to make critical flight decisions with minimum interpretative effort. The computation of the above cockpit data is performed using standard estimation techniques, including linear techniques, nonlinear techniques, and analog neural nets.

Methods for Range and Spatial Distribution Determination

Time Rate of Change of Angular Size

In the case of an angular scanning radiometer, the range can also be determined from the rate at which the subtended angle of a feature increases. If, for instance, the subtended angle doubles as the aircraft proceeds 1 km, the range of the feature has halved, or decreased from 2 km to 1 km. Thus, the time series of the radiometer observations contains range information. As is shown in FIG. 8, the angular size $h_F$ of features as observed by a scanning radiometer is inversely proportional to the distance to the feature:

$$h_F \sim W_F/R_F \text{ and } \delta R_F/R_F \sim -\delta W_F/W_F$$

This equation contains two unknown quantities, the feature width $W_F$ and its range $R_F$ from the radiometer. The subtended angle $h_F$ is measured at a plurality but at least two times (ranges), yielding at least two equations that can be solved for these two unknown quantities, the feature width $W_F$ and its range $R_F$ from the radiometer. Correlation of the angular distribution of features in the current scanned intensity spectrum with that of previous scans yields the change in subtended angles of features. Range $R_F$ and feature width $W_F$ can therefore be computed from this information and the velocity and/or change in position of the aircraft. The correlation of features in the scanned intensity spectrum can be determined with standard correlation techniques and including the angular expansion of features as the aircraft proceeds.

Beers-Lambert Intensity:

Depending upon the homogeneity of the medium being observed, the sensitivity of passive radiometers diminishes in roughly an exponential form with distance from the antenna. FIG. 9 shows the shape of the observed intensity of an observed feature and depicts three different positions in time on the range curve. Therefore, as an airborne observing platform proceeds through the medium, signatures will change in amplitude, the rate of change of which can be used to determine from where on the exponential slope the signature originates from, and therefore the range. Using the Beers-Lambert law:

$$I_1 = I_0 \exp(kr_1)$$

$$I_2 = I_0 \exp(kr_2)$$

$$I_3 = I_0 \exp(kr_3)$$

inserting intensity measurements $I_1$, $I_2$, and $I_3$, from a plurality but at least three different aircraft positions $r_1$, $r_2$, and $r_3$ into the Beers-Lambert equation, and knowing the change in range from the aircraft navigation equipment, the intensity of and range to said feature can be computed, as well as the frequency dependent extinction $k_{ext}$ of the intervening medium. These measurements can be made at a plurality of frequencies, and therefore extinction coefficients, to extract additional information on the spatial distribution of meteorological parameters.

Characteristic Features Observed at a Plurality of Frequencies with Different Absorptions, and Therefore Different Range Sensitivities As is described in the U.S. Pat. No. 5,526,676, the range to features of interest can be adjusted by observing characteristic signals that are additive to a plurality of spectral intervals with differing attenuations. The variation in absorption in the region of the atmospheric spectrum can be seen in FIG. 5. The weighting functions that describe the sensitivity of the radiometer as a function of optical depth, and therefore distance, from the antenna, are dependent upon the extinction of the atmosphere, and therefore the frequency of observation. The weighting functions describe the sensitivity of the radiometer receiver to the level or intensity of a certain signal due to physical temperature or other radiometric signature or increment of change in physical temperature or other radiometric signature as a function of distance r from the radiometer, and can be described by the following equation:

$$W(r) = e^{-\tau(0,r)} \frac{\partial a(r)}{\partial p} \left[ T(r) - T_{bg} e^{-\tau(r,\infty)} - \int_r^\infty T(r') \alpha e^{-\tau(r,r')} dr' \right]$$

$\tau, \alpha, \rho, T, T_{bg}, r$ where $$W_c(r) = \frac{dT_{b,v}}{dc(r)}$$

are opacity, absorption, density of emitter (absorber), physical temperature, temperature of background (cosmic or Earth), and range.

The weighting functions W(r) can be quickly and straightforwardly calculated from in situ measurements on the airborne platform or derived from the time series of the forward looking radiometer signal as the airborne platform progresses through the atmospheric medium.

Tomography, 2D and 3D

The lines of sight of the scanning radiometer (horizontal or vertical, or both) form intersections with lines of sight of previous aircraft platform positions (FIGS. 12A & 12B) provided that the intersections span the entire volume being sampled. Alternatively, provided that the emitted signal from regions beyond where intersections are present are known or can be estimated or modeled, the spatial structure of the emitting medium in the volume containing intersections can be determined utilizing standard methods of emission computerized tomography (CT) for nondiffracting media. Knowing the spatial structure directly gives range information. Scanning in one plane yields a 2D image of the structure, while scanning on two axes yields 3D structural information.

Summary

The aircraft icing remote sensing system of the present invention measures microwave radiometric signatures of hydrometeors and meteorological conditions. Although specific embodiments are disclosed herein it is expected that those skilled in the art can and will design alternative microwave radiometric sensing systems that are within the scope of the following claims literally or under the Doctrine of Equivalents.

What is claimed:

1. A passive polarimetric microwave radiometer, located in an aircraft or at a suitably high location near an aircraft landing site, for detection of aircraft icing conditions, comprising:

means for monitoring a region of space located in the field of view of said radiometer to detect a presence of at least one predetermined radio frequency of brightness temperature signal;

means for calculating a spectral signature intensity among said at least one predetermined radio frequency, including at least one of: signal magnitude, magnitude of signal in at least two orthogonal polarizations, signal attenuation; and means for determining a presence of aircraft icing conditions based upon at least one of: determined spectral and polarization signature differences.

2. The passive polarimetric microwave radiometer of claim 1 further comprising:

means for generating an alert indication from the class of indications including: an icing probability-range indicator, cloud liquid water maps, audible warnings of imminent icing conditions.

3. The passive polarimetric microwave radiometer of claim 1 wherein said means for monitoring comprises:

means for scanning in at least one of: a vertical direction through a predetermined angular range, a horizontal direction through a predetermined angular range, and in vertical and horizontal directions through a predetermined angular range for each of said vertical and horizontal directions.

4. The passive polarimetric microwave radiometer of claim 3 wherein said means for scanning comprises:

focal plane array means spanning at least one of: the vertical and horizontal angles desired.

5. The passive polarimetric microwave radiometer of claim 3 wherein said means for scanning comprises:

a plurality of antenna means spanning the vertical and/or horizontal angles desired.

6. The passive polarimetric microwave radiometer of claim 1 wherein said means for monitoring comprises:

a plurality of polarimetric radiometers, each of which operates to monitor a signal of at least one of: a predetermined elevation angle, a predetermined azimuth angle, a predetermined polarization, and a predetermined frequency.

7. The passive polarimetric microwave radiometer of claim 1 wherein said means for monitoring comprises:

a tunable polarimetric radiometer, which operates to monitor signals of a predetermined frequencies.

8. The passive polarimetric microwave radiometer of claim 1 wherein said means for calculating a spectral signature intensity comprises:

means for observing a spectral signature difference in at least two orthogonal polarizations among said at least one predetermined radio frequency.

9. The passive polarimetric microwave radiometer of claim 1 wherein said means for calculating a spectral signature intensity comprises:

means for observing a spectral signature difference in at least two orthogonal polarizations among each of a plurality of said at least one predetermined radio frequency.

10. The passive polarimetric microwave radiometer of claim 1 wherein said means for determining comprises:

means for calculating range by observing at least one of: characteristic features utilizing the variation in attenuation, and therefore in distance, of the atmospheric spectrum, the change in intensity of signal from characteristic features with distance traveled, and therefore the distance to said features, and the rate of change of angular size of characteristic features in the radiometer observations as the airborne platform moves toward or away from these features.

11. The passive polarimetric microwave radiometer of claim 1 wherein said means for determining comprises:

means for calculating range by using tomographic methods on intersecting vectors of observations obtained by scanning the field of view of the radiometer in at least one of: the horizontal plane, the vertical plane, and a combination of both said horizontal plane and said vertical plane.

12. The passive polarimetric microwave radiometer of claim 1 wherein said means for determining comprises:

means for identifying abrupt changes in the time series of the spatial distribution of said determined spectral signature difference to identify regions of electrification and potential icing and high turbulence conditions.

13. A method of operating a passive polarimetric microwave radiometer, located in an aircraft or at a suitably high location near an aircraft landing site, for detection of aircraft icing conditions, comprising the steps of:

monitoring a region of space located in the field of view of said radiometer to detect a presence of at least one predetermined radio frequency of brightness temperature signal;

calculating a spectral signature intensity among said at least one predetermined radio frequency, including at least one of: signal magnitude, magnitude of signal in at least two orthogonal polarizations, signal attenuation; and determining a presence of aircraft icing conditions based upon at least one of: determined spectral and polarization signature differences.

14. The method of operating a passive polarimetric microwave radiometer of claim 13 further comprising the step of:

generating an alert indication from the class of indications including: an icing probability-range indicator, cloud liquid water maps, audible warnings of imminent icing conditions.

15. The method of operating a passive polarimetric microwave radiometer of claim 13 wherein said step of monitoring comprises:

scanning in at least one of: a vertical direction through a predetermined angular range, a horizontal direction through a predetermined angular range, and in vertical and horizontal directions through a predetermined angular range for each of said vertical and horizontal directions.

16. The method of operating a passive polarimetric microwave radiometer of claim 15 wherein said step of scanning comprises:

operating a focal plane array spanning at least one of: the vertical and horizontal angles desired.

17. The method of operating a passive polarimetric microwave radiometer of claim 15 wherein said step of scanning comprises:

operating a plurality of antenna means spanning the vertical and/or horizontal angles desired.

18. The method of operating a passive polarimetric microwave radiometer of claim 13 wherein said step of monitoring comprises:

operating a plurality of polarimetric radiometers, each of which operates to monitor a signal of at least one of: a predetermined elevation angle, a predetermined azimuth angle, a predetermined polarization, and a predetermined frequency.

19. The method of operating a passive polarimetric microwave radiometer of claim 13 wherein said step of monitoring comprises:

operating a tunable polarimetric radiometer, which operates to monitor signals of a predetermined frequencies.

20. The method of operating a passive polarimetric microwave radiometer of claim 13 wherein said step of calculating a spectral signature intensity comprises:

observing a spectral signature difference in at least two orthogonal polarizations among said at least one predetermined radio frequency.

21. The method of operating a passive polarimetric microwave radiometer of claim 13 wherein said step of calculating a spectral signature intensity comprises:

observing a spectral signature difference in at least two orthogonal polarizations among each of a plurality of said at least one predetermined radio frequency.

22. The method of operating a passive polarimetric microwave radiometer of claim 13 wherein said step of determining comprises:

calculating range by observing at least one of: characteristic features utilizing the variation in attenuation, and therefore in distance, of the atmospheric spectrum, the change in intensity of signal from characteristic features with distance traveled, and therefore the distance to said features, and the rate of change of angular size of characteristic features in the radiometer observations as the airborne platform moves toward or away from these features.

23. The method of operating a passive polarimetric microwave radiometer of claim 13 wherein said step of determining comprises:

calculating range by using tomographic methods on intersecting vectors of observations obtained by scanning the field of view of the radiometer in at least one of: the horizontal plane, the vertical plane, and a combination of both said horizontal plane and said vertical plane.

24. The method of operating a passive polarimetric microwave radiometer of claim 13 wherein said step of determining comprises:

identifying abrupt changes in the time series of the spatial distribution of said determined spectral signature difference to identify regions of electrification and potential icing and high turbulence conditions.

25. A passive polarimetric microwave radiometer, located in an aircraft, for detection of aircraft icing conditions, comprising:

a plurality of polarimetric radiometers, each of which operates to monitor a signal of a predetermined frequency, for monitoring a region of space located in front of said aircraft to detect a presence of a plurality of predetermined radio frequencies of clear-air brightness temperature signals;

signal processor means for calculating a spectral signature difference among said plurality of predetermined radio frequencies, including at least one of: signal magnitude, signal polarization, signal attenuation; and spectral signature processor means for determining a presence of aircraft icing conditions based upon said determined spectral signature difference.

26. The passive polarimetric microwave radiometer of claim 25 further comprising:

means for generating an alert indication from the class of indications including: an icing probability-range indicator, cloud liquid water maps, audible warnings of imminent icing conditions.

* * * * *